(12) United States Patent
Watanabe et al.

(10) Patent No.: US 8,116,597 B2
(45) Date of Patent: Feb. 14, 2012

(54) INFORMATION DISPLAY DEVICE AND INFORMATION DISPLAY METHOD

(75) Inventors: Takashi Watanabe, Kokubunji (JP); Hiroshi Sako, Shiki (JP); Hiroto Nagayoshi, Kunitachi (JP); Toshiro Uemura, Nisshin (JP)

(73) Assignee: Hitachi-Omron Terminal Solutions, Corporation, Tokyo (JP)

( * ) Notice: Subject to any disclaimer, the term of this patent is extended or adjusted under 35 U.S.C. 154(b) by 543 days.

(21) Appl. No.: 12/370,723

(22) Filed: Feb. 13, 2009

(65) Prior Publication Data
US 2009/0154765 A1 Jun. 18, 2009

Related U.S. Application Data

(63) Continuation of application No. 12/216,736, filed on Jul. 10, 2008.

(30) Foreign Application Priority Data

Aug. 7, 2007 (JP) .................................. 2007-204873

(51) Int. Cl.
*G06K 9/60* (2006.01)
(52) U.S. Cl. ...................... 382/305; 382/282; 382/307
(58) Field of Classification Search .................. 382/282, 382/286, 305, 307
See application file for complete search history.

(56) References Cited

U.S. PATENT DOCUMENTS

| | | | |
|---|---|---|---|
| 7,358,502 B1 * | 4/2008 | Appleby et al. | 250/370.14 |
| 7,453,492 B2 * | 11/2008 | Silverbrook | 348/207.2 |
| 7,496,228 B2 * | 2/2009 | Landwehr et al. | 382/170 |
| 7,535,561 B2 * | 5/2009 | Chikamatsu et al. | 356/237.2 |
| 7,626,569 B2 * | 12/2009 | Lanier | 345/156 |

FOREIGN PATENT DOCUMENTS

| | | |
|---|---|---|
| CN | 1617584 | 5/2005 |
| JP | 06-209180 | 7/1994 |
| JP | 2002-072994 | 3/2002 |
| JP | 2000-259139 | 9/2009 |

OTHER PUBLICATIONS

Takashi Watanabe et al "A Display Technique for Preventing Electromagnetic Eavesdropping Using Color Mixture Characteristic of Human Eyes", May 19, 2008, Information Hiding Lecture Notes in computer Science, Springer Berlin Heidelberg, pp. 1-14.

* cited by examiner

*Primary Examiner* — Yosef Kassa
(74) *Attorney, Agent, or Firm* — Antonelli, Terry, Stout & Kraus, LLP.

(57) ABSTRACT

In order to prevent interception of information through leakage electromagnetic waves when transmitting the information using an image display unit, an image converter generates plural converted images, stores the generated converted images in an image storage, an image output unit reads out the converted images from the image storage and transmits the converted images to a screen control unit successively. The screen control unit displays a reception image on an image display unit. The image output unit outputs the converted image group at a high speed, thereby performing a switching display on the image display unit, and shows an image visually equivalent to the input image.

19 Claims, 26 Drawing Sheets

FIG. 14

| INPUT | | OUTPUT | |
|---|---|---|---|
| ORIGINAL PIXEL I (x, y) | $r_0$ (x, y) | $P_0$ (x, y) | $P_1$ (x, y) |
| ☐ | 0 | ▨ | ▨ —1401 |
| | 1 | ▨ | ▨ —1402 |
| ■ | 0 | ▨ | ▨ |
| | 1 | ▨ | ▨ |

INFORMATION DISPLAY DEVICE AND INFORMATION DISPLAY METHOD

CROSS REFERENCE TO RELATED APPLICATION

This application is a continuation application of U.S. application Ser. No. 12/216,736, filed Jul. 10, 2008, the contents of which are incorporated herein by reference.

CLAIM OF PRIORITY

The present application claims priority from Japanese patent application JP 2007-204873 filed on Aug. 7, 2007, the content of which is hereby incorporated by reference into this application.

FIELD OF THE INVENTION

The present invention relates to information display devices and information display methods, and particularly to a measure against information leakage by TEMPEST (Transient Electro-Magnetic Pulse Emission Surveillance Technology), etc.

BACKGROUND OF THE INVENTION

Various electric devices which need calculations and control such as a central arithmetic unit (CPU) mounted on a small microcomputer, a personal computer, or a server have been constructed from a large number of transistors with advancement in function. A transistor is operated by electric power. The consumed electric power in operation tends to increase with the operation speed (clock rate). For example, a penetration current generated at the time of switching of a CMOS inverter increases with the increase in a clock rate. The penetration current flows out of a power supply into a grounding conductor. By the current change through the grounding conductor, an electromagnetic wave is emitted with the grounding wiring as an antenna. Larger is the amount of change of current, stronger is the radiated electromagnetic wave. The electromagnetic wave thus generated without intention is called a leakage electromagnetic wave.

Groups of transistors are mutually connected with the wiring which is stretched around the inside of an integrated circuit (IC). Metals, such as copper, and aluminum, are generally used as a material of wiring. When electrons pass through the wiring, an electric and a magnetic fields change around the wiring due to the variation of the amount of electrons with time passing through the wiring. The wiring is not necessarily closed within the IC. Some of information transmitted along the wiring (binary information corresponding to 0 or 1 in many cases) is transmitted from a small-outline integrated circuit forming a chip to the outside or transmitted from the outside. Here, the outside may be an exterior of a chip considered in the unit of chip, or an exterior of a module considered in the unit of functional module, and may not necessarily be the physical outside of an IC chip. This is because a technique such as a SoC (System on Chip) is used wherein plural functions are integrated into one chip such as a computer and a storage device. Another technique is also developed in which chips are not explicitly connected with wiring, but electrode pads are stuck together, thus making the boundary not always clear between the inside and the outside of an IC chip. However, it is still true that the exchange of information is performed through the wiring which connects between plural functional modules.

In a general logic circuit in which a signal is considered to be 1 when the voltage of the signal is equal to or larger than a certain threshold, and 0 when the voltage is less than the threshold, it is important that a voltage is maintained at a predetermined value between the transmitting and the receiving side of the signal. A voltage drop occurs as the distance of a line becomes long between the transmitting and the receiving side of a signal due to an increase in electrical resistance along the line. Accordingly, the voltage of the signal is raised to a high value at the transmitting side so that the signal may not decline below the threshold in the course of transmitting as the length of the wiring is long for transmitting the signal. The potential difference between the cases of transmitting 1 and 0 is clearly large. The larger the variation of the voltage in unit time is, the larger the variation of the electric field generated in the surroundings is. Similarly, since a change of current occurs at switching, a change of magnetic field is also generated. Thus, an electromagnetic wave is generated corresponding to the change of voltage. That is, transmitted information corresponding to the change of voltage can be indirectly known by observing the change of the magnetic and electric fields generated in the surroundings of wiring. In order to respond to the voltage drop along a wiring path, an amplifier, etc. are installed on the route and a method of raising the voltage, etc. are employed. Even in this case, it is the same that there exist correlation between the voltage variation and the transmitted information.

For a device which is miniaturized and consumes only a small power, variation of the magnetic and electric fields caused by the phenomena described above is small since such a device has a short wiring and needs low operation voltages. And the electromagnetic wave generated when information terminals such as a computer operate, is controlled so as to make the intensity small by following the standard of VCCI (Voluntary Control Council for Information Technology Equipment), etc. Even so, it is possible to intercept faint electromagnetic waves by using a highly efficient antenna and receiver.

The information about the operation condition of the information terminal represented by the data currently transmitted is included in the intercepted electromagnetic waves. Accordingly, if the intercepted information is analyzed appropriately, the information about the contents of keying of a keyboard, a display to a monitor, etc. can be read out. Since a monitor used for a personal computer, etc. is also constituted from transistors and operated as shown in FIG. 4, electromagnetic waves are generated from the monitor 401 corresponding to an operating state. Although the electromagnetic waves thus generate are generally weak, it can be intercepted by using a highly efficient antenna 402 and a highly efficient receiving set 403. By analyzing and displaying an interception result on a monitoring unit 404 for displaying an interception result, an image can be reproduced corresponding to the contents of a display of the monitor 401.

Besides the electromagnetic waves propagated through the air, there also exists an electromagnetic wave propagating through metallic parts of the power cable or various kinds of the connecting cables of a device. For example, the voltage of a grounding terminal is changed due to a voltage variation generated in transmitting a signal or a penetration current generated in switching of a transistor, and the voltage change of the terminal propagates through the power cable of the device. Since the electric signal propagating in the metal has a smaller attenuation in magnitude than in the air per unit distance and mixing of noise is less, the interception of the signal is attained at a distant place.

As a measure, as disclosed in JP-A-Hei6(1994)-209180, for preventing information from interception outside of the building is performed by shielding the wall of a building, and leakage of electromagnetic waves is confined inside of a device by shielding treatment for the housing of a device to absorb and intercept the electromagnetic radiation. Other measures are taken such as mounting a low pass filter to a signal cable to reduce a leakage of high frequency electromagnetic wave, and generating jamming wave to jam interception of leakage electromagnetic waves.

SUMMARY OF THE INVENTION

Although a shielding measure can reduce the amount of leakage electromagnetic waves, the shielding measure does not cut off the signal source. To rebuild a building or to remodel a device requires a large cost when a stronger measure is needed due to an improvement in efficiency of an interception device. Since when generating jamming, the maximum is defined by specifications of, such as VCCI, there is a limit to the quantity of jamming which can be generated. Therefore, sufficient effect is not necessarily obtained for the purpose of blocking interception of a leakage electromagnetic wave. The object of the present invention is to reduce or prevent leakage of the original display image by leakage electromagnetic wave interception.

An information transmitting device can be asserted to be safe from interception of a leakage electromagnetic wave if a third party cannot presume information transmitted between a normal transmitter and a receiver from intercepted information, since the information transmitted between a normal transmitter and a receiver is different from the information intercepted by an illegal third party through a leakage electromagnetic wave, even if the leakage electromagnetic wave itself is not eliminated. The present invention provides an information display device and an information display method wherein transfer of image information is performed properly between a normal transmitter and a receiver, but not performed properly for a third party who intercepts a leakage electromagnetic wave. An information display device and an information display method of the present invention are based on processing and displaying a display image in the form the original state cannot be restored therefrom by the third party intercepting the information.

A basic method of the present invention is described first in the following description. Then, as an embodiment according to the above mentioned basic method, two methods are described; in one of them a numerical sequence is added to each pixel value of a display image, and in the other a display image is encoded in a different basic pixel unit. And a disturbance method of synchronization information is described.
<Basic Method of the Present Invention>

A case where a certain image I is transmitted and received between normal operators is considered. When a transmitter S of an image I transmits the image I to an addressee R of the image I, the transmitter S generates images Pi (i∈N) of N sheets from the image I, and transmits the generated images Pi (i∈N) to the addressee R. Here, N is an integer larger than one. Generation and transmission of an image are performed in such a way that reproduction of the image I cannot be performed from an independent Pi, but can be performed only from plural Pi's. This specification describes, as one of the methods, how to generate a first converted image obtained by adding the image I and a numerical sequence, which is stored internally, and a second converted image obtained by subtracting the numerical sequence from the image I. The above procedure may be arranged that it is impossible to reproduce the image I even if only one of the Pi(s) is missing, and all the Pi(s) are required to reproduce the image I. This specification describes, as one of the methods, how to generate a first encode image obtained from a certain numerical sequence stored internally, and a second encode image using the image I and the numerical sequence.

Following to a common display, transmission of image information is performed by a method which needs synchronization information Is when displaying. The synchronization information Is is transmitted together with the image Pi. Synchronization information here means for example, a pixel clock, a horizontal synchronization signal, and a vertical synchronization signal used when displaying an image on a monitor. In analog-data transmission of VGA, a horizontal synchronization signal and a vertical synchronization signal are transmitted with pixel information. Rendering to a display is performed in the monitor based on a horizontal synchronization signal and a vertical synchronization signal which are received. In digital data transmission of DVI, a pixel clock is transmitted with the pixel information. Rendering to a display is performed in the monitor based on a received pixel clock.

Display information is transmitted via a signal cable, etc. between a normal transmitter and a receiver. That is, the communication path between a normal transmitter and a receiver is a metallic cable, etc. with an impedance matching, etc., and has little information loss. On the other hand, communication path between a display information transmitter and an interceptor is an atmosphere through which an electromagnetic wave propagates and the electromagnetic wave is generated by a current passing through metallic cables with impedance is not matched. Accordingly the path has a large information loss. The more the number of image Pi (i∈N) generated from the image I increases, the more the difficulty increases for an interceptor to acquire all information correctly, and interception of the image I becomes impossible since some image Pi are missing.

The image Pi (i∈N) is not always transmitted explicitly one by one, but also transmitted serially or parallel without a break. Although a logic signal to show a break of the image may be transmitted in parallel in some cases, the image data may be regarded to be transmitted without a break from a time series of the image data transmission state. Therefore, in addition to plural Pi's, the synchronization information Is for denoting a break of the image is required in order to reproduce the image I from the image Pi. As for the synchronization information Is, an interceptor can not always intercept the information correctly. However, if the synchronization information Is is transmitted without processing of the image I according to the present invention, the interceptor can search the correct synchronization information Is by trying restoration supposing various synchronization information to the intercepted information. This is because the image I generally includes much redundancy, and a method of trying restoration supposing the various kinds of synchronization information is equivalent to performing information search for an interceptor utilizing the redundancy. Since the redundancy of a display image becomes small and it becomes difficult to determine a starting position of the image Pi by increasing a numerical magnitude and a variance (also can be expressed as a quantity of noise to be mixed) which are added to the image I in a device according to the present invention, intercepted information cannot be used in order to search for the correct Is. In other words, since the redundancy of the image Pi to be transmitted is smaller than the redundancy of the original image I, information to be used as a basis of information search is deficient for an interceptor. As a result, searching for synchronization information becomes difficult. An expression of noise in this specification means information from sources of information different from that of the input image. Unpredictable information for anyone is nothing but a noise such as a random number generated using a random number generating device, and unpredictable information for an interceptor is regarded to be a noise although the information is regular. If a computer environment is assumed, a transmitter S in the above is on the generator's side such as a CPU and a graphic card in the computer to generate an image to be displayed to a user, and the receiver R may be the user, or a display device such as a monitor which presents information directly to the user.

<Method of Adding Numerical Sequence to Each Pixel Value of Display Image>

A device according to the present invention includes a number array supplier for storing a numerical sequence and outputting the numerical sequence, an image conversion unit for calculating the numerical sequence data from a digital display image data and the number array supplier, and converting the digital display image data, and a memory unit for storing and outputting to the exterior the digital display image data generated and converted by the image converter, wherein the number array supplier has numerical sequences from the first to the Nth sequence (N is an integer equal to or larger than 2) constituting a numeric-array of n×m, the image converter receives the Mth inputted image (M∈{1, . . . , N} of the numeric-array of n×m (n and m are integers), and also receives the Mth numerical sequence from the number array supplier, records the Mth conversion result on the memory unit generated by calculation of the Mth inputted image and the Mth numerical sequence, and outputs one by one from the memory unit.

The number array supplier may have a fixed numerical sequence beforehand or, alternatively, generates a numerical sequence arbitrarily at the time of initialization and output by an output control signal from a controller or the image converter, or may generate a numerical sequence dynamically using a random number generating device. Although a display image is different from an inputted image when other numerical sequences are generated so that a visual change of the inputted image is suppressed caused by an image conversion with a certain numerical sequence, the image conversion can be made such that an image can be recognized visually as more similar to the input image.

As for brightness of a plurality of continuous display images, averaging is performed visually. That is, if an image with a brightness k is displayed at a certain time, and an image with a brightness 0 is displayed in the succeeding time and this change is in a short time, an image with a brightness k/2 is recognized visually. This is a characteristic of vision called middle mixed colors. Therefore, the method to generate a plurality of converted images by the image converter is also desirable for the vision characteristics since denoting the values corresponding to the coordinates (i, j) of the input image by $a_{i,j}$ (i∈{1, . . . , n}, j∈{1, . . . , m}), the values corresponding to the coordinates (i, j) of the numerical sequence by $b_{i,j}$, and the values corresponding to the coordinates (i, j) of the conversion result by $a'_{i,j}$, then the conversion is performed as the relation $a'_{i,j}=a_{i,j}\pm b_{i,j}$, holds.

For example, suppose that a pixel value of a certain inputted image is "128" in 8 bits in an 8-bit image. The image converter calculates a pixel value of the first converted image to be "128+r", that of the second converted image to be "128−r" from the output r of the number array supplier. If these two outputted images are displayed for a short time, then the average of the pixel values of the images is "128", which is recognized visually. However, an image actually displayed has a different pixel value from the original value, and even if electromagnetic waves, etc. generated depending on a pixel value are intercepts, the original pixel value "128" cannot be known. Here, it is assumed that the output r of the number array supplier is larger than or equal to 0 and less than 128. This is because a display device is generally constituted such that brightness of a display image is specified by an integer, and if r is less than 0 or larger than 128 the correct pixel value cannot be specified. Of course, there are some which are constituted so that negative numbers are permitted internally, or positive numbers larger than allowable range for set up can be set up externally. A value of a calculation result can also be adjusted with post-processing, etc. Therefore, the range of the value r is not limited to the above by all cases.

Owing to the characteristics of vision of the middle mixed colors, in the number array supplier using the first to the (N−1)th numerical sequences, and denoting the numerical value corresponding to the coordinates (i, j) of the k-th numerical sequence by $R_{k,i,j}$, (k∈{1, . . . , N}, i∈{1, . . . , n}, j∈{, . . . , m}), operation is performed as $R_{N,i,j}=-(R_{1,i,j}+\ldots+R_{N-1,i,j})$, for the Nth numerical sequence, then, in the converted images of N sheets displayed in a short time, the effect of the added numerical sequence is canceled visually. As a result, an image equivalent to the input image can be seen, although a large noise exist in an image displayed on a display by the addition of a numerical sequence performed by the conversion with the numerical sequence. In generating the first to the (N−1)th numerical sequences, if a random number generating device is used, a converted image with a large noise can be acquired without depending on the feature of the input image.

Although it is optimal to constitute the operation so that a result of addition from the first to the Nth numerical sequences is set to 0, the result of addition may not necessarily be 0, since human eyes may not fully recognize a slight change of brightness. In a display in which a gradation of a pixel is represented by 8 bits, for example, a change of 7 bit or less than that does not bring about a big change on vision. Therefore, the number array supplier may supply less than ½ value of the maximum gradation k for from the first to the Nth numerical sequences. A region for the addition result may be determined without depending on the coordinates or depending on the input image. For example, when a pixel value of the input image is large i.e., when the brightness is large, a little change in the pixel value does not cause an appreciable problem with vision so that an allowable range of the addition result may be taken large, but when a pixel value of the input image is small, the allowable range is taken to be small. That is, using a certain monotonically increasing function f, and letting the pixel value pi of an inputted image be an input, the allowable upper limit u of an added result is calculated as u=f ($p_i$). However, the function f is not necessarily to be a monotonically increasing function. Because, when brightness is large in many regions of an input image, and brightness is small in only a few regions, any visual problems are not caused even if the addition result becomes large in a region where the pixel value of the input image is small. Thus, by using the function f different according to the feature of an inputted image, still good visual images are obtained even a numerical sequence with larger values are added. In a color image, since a green plane and a blue plane have different visual brightness even both planes have the same pixel value, the above-mentioned dependency may be determined for every plane.

Since additive color mixing is an arithmetic mean of brightness, denoting the value corresponding to the coordinates (i, j) of the input image by $a_{i,j}$ (i∈{1, ..., n}, j∈{1, ..., m}), the value corresponding to the coordinates (i, j) of the numerical sequence by $b_{i,j}$, and the value corresponding to coordinates (i j) of the conversion result by $a'_{i,j}$, then the image converter calculates as $a'_{i,j}=a_{i,j} \times b_{i,j}$, and the number array supplier with using the first to the (N−1)th numerical sequences, calculates the Nth numerical sequence as $R_{N,j}=N(R_{1,j}+ \ldots +R_{N-1,j})$. Then by outputting the converted images in a short time, an image corresponding to the input image can be visually seen.

An information display device according to the present invention has a feature that a display image is visually corresponding to a reproduced image of the input image, therefore, generated converted images are displayed in a short time. Thus, in order to correspond to a high speed switching of display of 30 or more sheets per second, converted images are outputted with a speed equal to or larger than 30 Hz. Although there is no particular upper limit in speed to output, since afterglow time of a fluorescent screen of general CRT is about 1 ms, the upper limit is enough to set also as 1 kHz or less.

In a common display, a display image is transmitted with the gradation of a pixel of the image is expressed in 8 bits for each color. That is, a value may be included in an converted image wherein the value cannot be expressed by 8 bits depending on a value of a numerical sequence supplied from the number array supplier. In such a case, where the result of addition of pixel value of the input image and the numerical sequence is larger than the maximum gradation value k, the result of addition of pixel value is set to k, and when the result of addition of pixel value is smaller than 0, the result of addition is set to 0. If there are only a few pixels wherein the gradation value is exceeding the maximum k or less than the minimum gradation value 0, the converted image has little influence visually. On the other hand, if the value $a'_{i,j}$ of the coordinates (i, j) of the Mth converted image is larger than the maximum gradation value k, calculation is performed as $p=a'_{i,j,k}$, and the obtained p is added to the (M+1)th converted images, and if the $a'_{i,j}$ is smaller than 0, then the value p calculated from $p=a'_{i,j}$ is subtract from the (M+1)th converted images. Since the influence of overflow or underflow can be corrected small, a visual image closer to the input image is obtained.

A device according to the present invention includes a color system conversion unit, the color system conversion unit converts an inputted image given by a first color system to a second color system, the image converter generates the converted image using the image converted into the second color system, the color system conversion unit converts the converted image from the second color system into the first color system, thereby the device can perform sufficient conversion with less processing. For example, in the case where an inputted image is represented in the RGB color system, it is necessary to calculate each color independently since RGB corresponds to the three primary colors. On the other hand, in the XYZ color system or the YIQ color system, since brightness information and color information are separated, processing such as adding the numerical sequence only to the brightness information can be performed. Since vision is insensitive to a color change, the numerical sequence may be added only to the color information.

Even when correction technique is used over the above-mentioned overflow or underflow, the correction is not sufficiently made depending on the values of the numerical sequence. In that case, image quality can be improved by a color system conversion technique. In the color system conversion technique, an arrangement is made that the first color system is the RGB color system, and the second color system is the CMY color system, and decision is made whether to perform a conversion of color system for every conversion of a pixel of the input image. The CMY color system is converted from RGB color system as Equation 1.

$$\begin{bmatrix} C \\ M \\ Y \end{bmatrix} = \begin{bmatrix} 255 \\ 255 \\ 255 \end{bmatrix} - \begin{bmatrix} R \\ G \\ B \end{bmatrix} \quad \text{(Equation 1)}$$

(where, RGB and CMY are assumed to take the values from 0 to 255, respectively). So, assuming that inputted images are represented in the RGB color system, and when adding a positive number if the pixel value of an inputted image is less than 128, calculation is made by the RGB color system, and if the pixel value of an inputted image is equal to or larger than 128, calculation is made by the CMY color system, thus the probability of overflow can be made small, and when adding a negative number (when a positive number is subtracted) if the pixel value of an inputted image is less than 128, calculation is made by the CMY color system, and if the pixel value of an inputted image is equal to or larger than 128, calculation is made by the RGB color system, the probability of underflow can be made small, thereby a visual image closer to the input image can be obtained.

When an inputted image is binary i.e., two colors of black and white, the pixel value of an inputted image may be changed into a gray value, and applied. For example, in the display system in which white is expressed as 255 black as 0 using 8 bits, by converting values such as white to 200 and black to 55 a bigger noise can be added and the disturbance effect can be increased. Such color conversion may be performed by the color system conversion unit, or a conversion processing may be performed by the image converter which receives the input image such that the range of the values always used is converted to the range, for the above example, from equal to or larger than 55 to equal to or less than 200. This processing can be applied not only to a binary image but also other images to increase the disturbance effect. When an inputted image is a gray image and the pixel value varies in the range from 0 to 255, a new value $p'_i$ is calculated from the original pixel value pi of the input image as $p'_i = \alpha \times p_i + \beta$, where α is a real number or a rational number larger than 0 and less than 1, and β is an integer in the range between 0 to 255 (when the pixel value is in the above range). For a color image after decomposing the image to each of the RGB planes, an image on each plane is converted similarly to the above grey image and combined, thereby the range of a pixel value can be converted. Although a linear transformation is performed in the above, as long as a new pixel value remains in a certain range of value, the conversion formula is not limited to the above, but a nonlinear transformation may be used. For example, when a pixel value is larger than a certain value u, the pixel value is converted to u.

On the contrary, the pixel value in a certain range of value may be converted to take a value in the wider range. When the same pixel value continues, the average value of generated random numbers over the continuation region becomes the pixel value due to the characteristic of the random number generating device. In order to prevent this, for example, a new pixel value $p'_i$ is obtained from the pixel value pi of an inputted image as $p'_i = p_i + \beta$, and then addition with a numerical sequence is performed, where β is, for example, is an integer from 255 to 255. In order to correspond to an overflow or an underflow, $p'_i$ is set to 0 if $p'_i$ becomes less than zero, and $p'_i$ is set to 255 if $p'_i$ becomes larger than 255. Although β may be fixed to a certain predetermined value, more effective disturbance of the pixel value can be realized by varying a setting in an adaptive manner for every pixel.

<Method for Encoding Display Image to Different Basic Pixel Unit>

The method according to the present invention includes the steps of receiving and recording the digital display image data which is a numeric array of n×m on the memory unit, generating number of N arbitrary numerical sequences (N is a positive integer) with numeric array of n×m using an arithmetic unit, generating number of N+1 encoded images which are numeric array of sn×tm (as for s and t, at least one of the two is a natural number larger than 1), and recording the encoded images on the memory unit, in which the step of generating the encoded image sets number of s×t/2 pixels as 0 and using the first template which sets s×t/2 pixels as 1 and the second template which reverses the pixel value of the first template copies the first template to a rectangle with the coordinates (si, tj) of the Mth encode image as the upper left and the coordinates (s(i+1)−1, t(j+1)−1) of the Mth encoded image as the lower right, if the value of the coordinates (i, j) of the Mth numerical sequence (M∈{1, . . . , N}) is 0, generates by copying the second template to a rectangle with the coordinates (si, tj) of the Mth encoded image as the upper left, the coordinates (s(i+1)−1, t(j+1)−1) of the Mth encoded image as the lower right if the value of the coordinates (i, j) of the Mth numerical sequence is 1, and generates the encoded image by the same method as the encoded image generation step using the (N+1)th numerical sequences that are generated by performing exclusive OR operation between the digital display image data and the first to the Nth numerical sequences, and records the encoded image on a memory device.

In each of the above methods, since the inputted digital display image data is assumed to be represented as a numeric-array of n×m since the information outputted to a display generally represents a two-dimensional image. However, three-dimensional space may be projected and displayed on a two-dimensional plane. In such a case, the present invention may be applied to the texture of a three-dimensional image.

Although the method of switching a display in a short time is described in the above, the display device may be constituted so that the generated converted images may be optically superimposed each other, for example, a plurality of display devices are provided and the converted images are displayed on each display, respectively.

According to the present invention, it is possible to reduce a correlation between leakage electromagnetic waves and processing information within a device than in the past. That is, it is possible to make difficult to intercept information from leakage electromagnetic waves.

<Effect of the Embodiment according to the Present Invention>

The effects of the embodiment according to of the present invention are a disturbance effect on the leakage electromagnetic waves by including a noise in the display image, and an interrupting effect on acquisition of the synchronization information by the disturbance. The former effect makes it difficult to acquire the information about an original image even granting that synchronization information is acquired, and the latter makes it difficult to acquire the synchronization information itself. The disturbance effect on the leakage electromagnetic wave is understood easily since the correlation between an inputted image and a display image becomes small by adding a numerical sequence obtained from the number array supplier. In the following, the acquisition difficulty of synchronization information is described.

Generally the synchronization information transmitted with image information is transmitted as a voltage signal, equivalent to image information. Therefore, it is difficult to separate the synchronization information included in the leakage electromagnetic wave, etc. from the image information contained in the leakage electromagnetic wave, etc. That is, since the exact synchronization information Is is not acquired, it is difficult to reproduce the image for an interceptor without searching for Is.

The image I is transmitted in streaming mode to a monitor. That is, as for two-dimensional image information, data is transmitted starting from the upper left toward the right one by one, and if the right end is reached the data from the left end of the following line is transmitted. This operation is the same as the scanning operation when a CRT monitor is drawing an image. Of course, as long as the data is transmitted in streaming mode, application of the present invention is not obstructed even if any portion of the image is first transmitted. The image I may be divided into some of a plurality of streams, such as every line, and may be transmitted in parallel. Since a stream should just be reproduced by a receiving side, when especially performing digital data transmission, a part of information is not necessarily transmitted as in the above-mentioned order. Although there is such a variation as described above in the implementation of the streaming, the technique according to this embodiment may be easily applied to protect a part of image information, etc., if attention is paid to the part the image I is transmitted in streaming mode.

Generally, since image information is transmitted continuously from computer start-up time, etc., the interceptor cannot know transmission start time of a certain image I. However, if general image display is assumed, expecting that the image is transmitted at the rate of 60 frames per second, and that the images of nearly the same contents are continuously transmitted over a multiple frames It is possible to find out the timing the identical information is transmitted using a technique called template matching to find out the position of a repeated pattern, and to know the time when the image I is transmitted. By using the above-mentioned method the synchronization information Is can be known from observing the repetition cycle of the image I.

However, in the information display device of the embodiment according to the present invention, even if observing an intercepted data, it is difficult to distinguish the image from a noise because the noise is mixed in the transmission image data. That is, to find out a repeated pattern is difficult by pattern matching. Even if in the case where the same inputted images continue the noise contained in the transmitted image becomes different by arranging the output of a pattern generator to have a different pattern at different times, thereby making unable to find out a repeated pattern, which should serves as a ground for applying pattern matching for the interceptor. Therefore, if the information display device of the embodiment according to the present invention is used, it is difficult for the interceptor to find out synchronization information.

As a result, the image I is delivered and received only between regular operators. Since the synchronization information Is is different for every device due to manufacturing variation, even if the synchronization information of a certain device leaks out, the synchronization information of other devices needs to be newly searched. A clock generation device for generating the synchronization information cannot be intercepted using the same synchronization information at a different time even for the same device, because a fluctuation generally arises due to a temperature variation. The information display device according to an embodiment of the present invention is provided with a random number generating device, and constituted so that the transfer of synchronization information or the synchronization information itself differ every period of time, then even in case where information about synchronization leaks, the safety of other information display devices is maintained.

Thus, the information transmission device and information transmission method being able to transmit and receive information security can be realized against interception.

BRIEF DESCRIPTION OF THE DRAWINGS

FIG. 14 is a conversion table of an input image and a numerical sequence to the output image.

DETAILED DESCRIPTION OF THE PREFERRED EMBODIMENTS

This section first describes the fundamental composition of the computer or ATM used as the applied object of an embodiment according to the present invention. Next, an example of the method of adding a numerical sequence to each pixel value of a display image is described, and an example of the method of encoding a display image to a different basic pixel unit is described. Finally, the variation in composition of the present invention is described.

<Basic Description of the Applied Object of the Embodiment According to the Present Invention>

Figure 1:
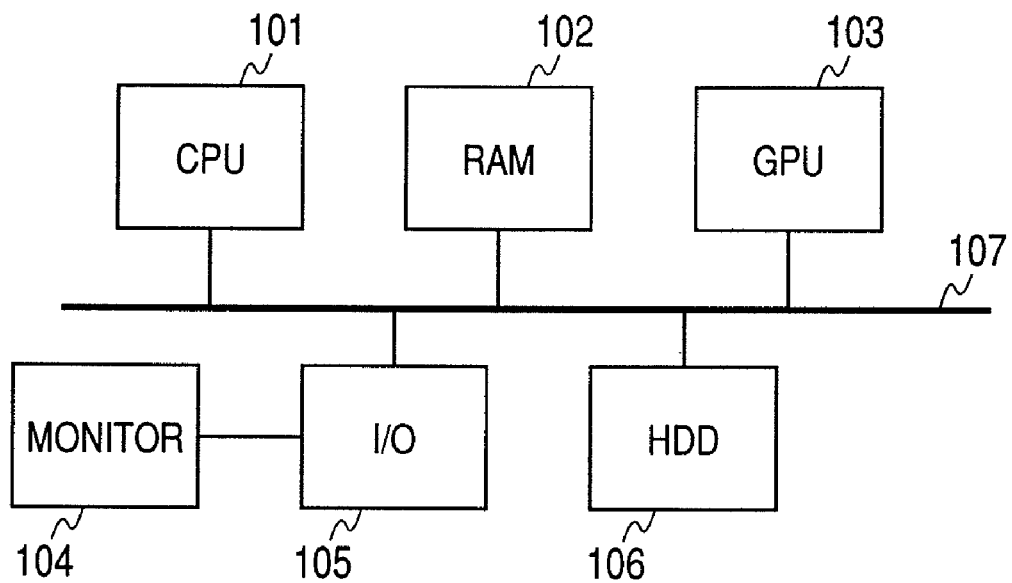
FIG. 1 is a block diagram of a computer.
Figure 2:
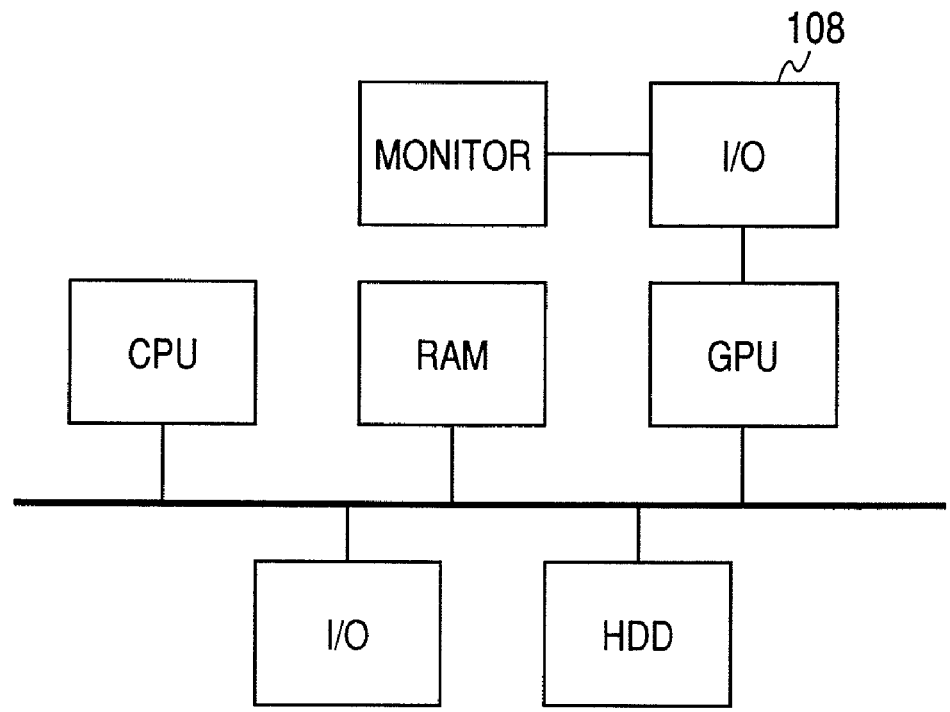
FIG. 2 is a block diagram of a computer.

The embodiment of the present invention provides an information display device for preventing the leakage of information by leakage electromagnetic wave interception, and assumes the exchange of the image information between computers and between a computer and a monitor. As shown in FIG. 1, a general computer includes a central arithmetic unit CPU 101, a main memory unit RAM 102, a secondary memory HDD 106 (may be a flash memory, CD-ROM, DVD, MO, FDD, and a USB memory), an image processing device GPU 103, an image output terminal, and an I/O terminal 105 represented by the network terminal. The above described devices are connected through wiring 107 called an internal bus and connection to a network, etc. is made through the I/O terminal. For the I/O terminal, an R45 terminal for connecting to an Ethernet (Registered trademark), an R11 terminal for connecting to a modem, an RS232C terminal for serial communications, a parallel terminal for connecting to a printer, a PS/2 terminal for connecting to a keyboard or a mouse, a USB terminal, universal terminal for connecting to various equipment, an SCSI terminal, a connection terminal for connecting to a microphone or an earphone for a voice input/output, a PCI connection terminal for connecting boards to provide the computer with expanded functions, and a VGA terminal, a DVI terminal, etc. for connecting to an external monitor 104 The GPU is mainly used for improvement in the speed of three dimensional image processing, etc., and image processing in the embodiment of the present invention may be performed by the CPU. However, since the GPU itself has calculation ability, the image processing may be performed by the GPU. The GPU and CPU may share image processing. In addition, image processing may be performed using the expanded-function board linked to the terminals for expanded-function boards including the PCI terminal. An expanded-function board may be on the outside of the housing of a computer using those connected with the USB terminal, etc. As shown in FIG. 2, in some devices for performing high-speed image processing, an I/O terminal 108 for a monitor may be connected directly from the GPU. The I/O terminal 108 may be an output-only terminal for outputting an image, or a terminal corresponding to input and output assuming connection of the monitor with inputting functions, such as a touch panel. The I/O terminal 108 provided with the GPU may be used for output only of an image, and the input from a touch panel, etc. is connected to the I/O terminal 105 without passing the GPU. When transmitting the processed image information to a display connected from the main part of the computer, decomposition and combination of each image information item are performed according to the standard of VGA or DVI. VGA decomposes a signal into RGB corresponding to the three primary colors, and transmits the decomposed signal as an analog signal. Simultaneously, the vertical synchronization signal and horizontal synchronization signal according to the resolution and the frame rate of the display screen are transmitted. In the monitor side, a dot clock (also called a pixel clock) is generated from a vertical synchronization signal and a horizontal synchronization signal, and the suitable pixel information for each coordinates is written in according to a RGB code. This RGB code may be directly used for controlling the beam for pixel drawing as CRT, or the RGB code is converted by A/D conversion as LCD, and may be accumulated in an internal buffer. DVI decomposes an RGB code into digital one and performs transmission. The dot clock according to the resolution and the frame rate of the display screen is transmitted. Since the dot clock is transmitted as a digital data, the dot clock can be encoded. Since there is no correlation between the true data transmitted and the data actually transmitted through a signal cable if encryption is used, the information leaked from the signal cable is not helpful for guessing the true data. In DVI, unlike RGB, digital data is distributed to two or more signal wires, and simultaneously transmitted in parallel. Therefore, the mode of generating electromagnetic waves differs from VGA. However, this is only on a signal cable, and the data on GPU or RAM wherein the display image is buffered is the same as that of VGA, and once the transmission of data is completed to a display, since the encryption is canceled and the original data is restored, the data stored in the buffer of a display is the same as that of VGA. There is also a display linked to a USB terminal, and the data is not necessarily decomposed and transmitted to a RGB code in this case. A composite terminal may be used when displaying on a television monitor, etc. In that case the image data is expressed with the luminance signal (Y) and chrominance signal (C) instead of RGB, and is transmitted in the form where all the united synchronized signals are compounded. In addition to this, Y and C may be separated and transmitted like a separate image terminal (S terminal). The signal may be separated into a luminance signal (Y), a blue difference signal (Cb/Pb), and a red difference signal (Cr/Pr) as a D connector. The signal is digitized as a HDMI terminal and there is also an encryption data communications form of HDCP which supports encryption at the time of data transmission. In a CRT monitor, a display is irradiated with an electron beam from the upper left to the rightward according to a dot clock. A dot clock is a clock which determines 1 pixel of lateral writing timing. According to a horizontal synchronization signal, the electron beam moves one pixel at a time rightward, and after scanning one line in the horizontal direction, the electron beam returns to the left of the screen again. According to a vertical synchronization signal, the electron beam moves downward by one line at a time, and after scanning to the lowermost part, the electron beam returns to the top line. That is, with a horizontal synchronization signal and a vertical synchronization signal, an electron beam scans the whole screen from the upper left to the lower right, and returns to the upper left again. In an LCD monitor, a transistor corresponding to each x y coordinates is driven one by one, and the pixel value is written in. Since digital processing is possible in the case of the LCD monitor, it is not necessary to follow an order such as in a CRT, a method to rewrite one line at a time, or a method to rewrite the whole screen at one time is available. A CRT monitor uses a method to irradiate a fluorescent screen for a short-time to generate a luminescence by the electron beam, and an irradiation by an electron beam again is required while there is an afterglow. Since the LCD monitor can store a pixel value, in some cases there may be a need to re-charge up the electric charge of each pixel at fixed timing, but a method of rewriting only coordinates where a change takes place. As for this, since a motion of a transistor changes according to change of a screen, the correspondence between an image data and internal processing is more complicated with an LCD than with a CRT. Although the CRT monitor can have a single display surface, the LCD monitor can have a plurality of display surfaces by providing a plurality of liquid crystal layers, since the liquid crystal layer is transparent.

Figure 3:
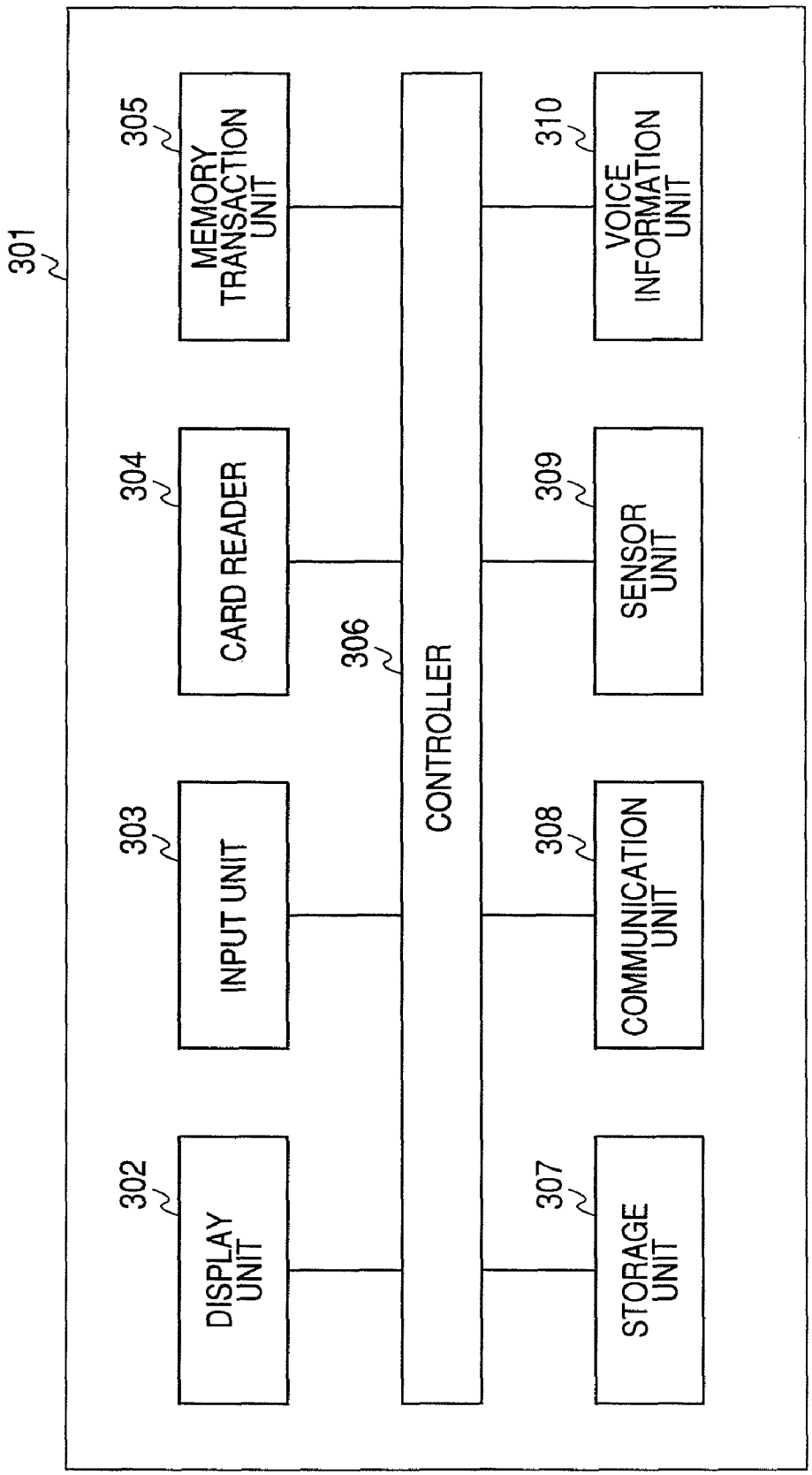
FIG. 3 is a block diagram of an ATM.
Figure 4:
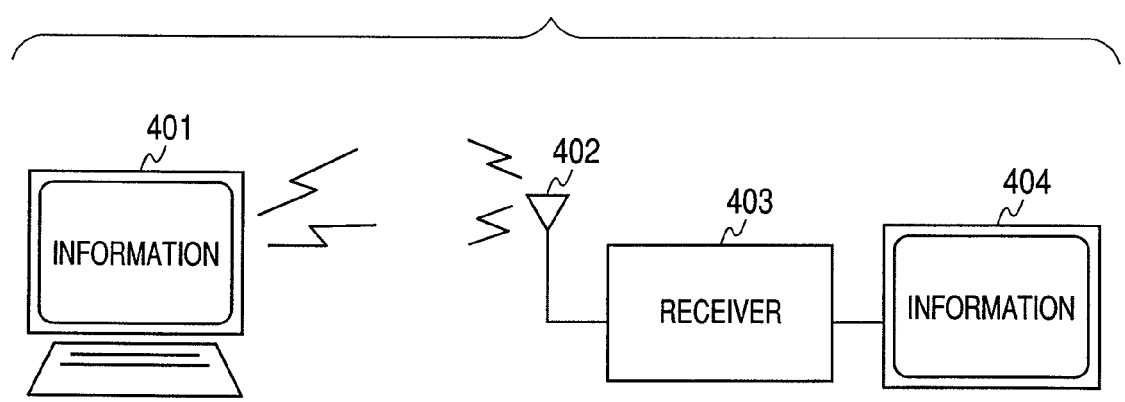
FIG. 4 is a scheme of an electromagnetic wave analysis device.

FIG. 3 shows a composition of ATM, which is one of the embodiments according to the present invention. A controller 306 controls a display section 302, an input unit 303, a card reader 304, a money transaction unit 305, a storage unit 307, a communication unit 308, sensor unit 309, and a voice information unit 310. The controller 306 controls not only the whole ATM 301, but also performs card recognition, approach detection of an operator and, bill handling, etc. The display section 302 shows a service content, processing procedure, etc. and CRT and a liquid crystal display are examples, and also includes display controls, such as GPU. The input unit 303 inputs the information from a user, such as selection of a menu, and a password input, and a keyboard and a touch panel are examples. The card reader 304 is for reading the information stored in the magnetic card or I C card. The money transaction unit 305 performs receipt and payment of money for transaction, such as an input for a deposit and discharge for a drawer of the bill. The storage unit 307 stores the information for processing by ATM, and a hard disk and a memory are examples. The programs for operating the controller 306, the communication unit 308, and the sensor unit 309, etc. are stored in the storage unit 307. The communication unit 308 performs communication between the ATM 301 and an external computer and a database through a line. An example of the sensor unit 309 is a human sensor for detecting an operator's approach, etc. The human sensor is mainly for detecting a person i.e., an operator in the vicinity of the sensor by observing an infrared generation state and reflection. Transaction service is started when an operator approaches to the distance where the operator can operate ATM. The voice information unit 310 is provided with a loudspeaker for performing the audio guidance to a person staying around devices including an operator. One of the well known ways to use the voice information unit 310 is to give an operator a direction of the next operation. The effect of audio guidance can be increased by being coupled to the display section 302. For example, if an image animation is displayed on the display section 302 to puts a cash card into a loading slot of ATM, the image animation is effective with the above-mentioned audio guidance. The communication unit 308 is connected to a LAN or a telephone line so that an exchange of data can be performed with a bank which installed the ATM, and a commissioned company of the ATM. Here, the commissioned company of the ATM is a company monitoring the ATM in a manner described according to the present application, and continuously monitoring a plurality of ATMs. using a camera, etc. connected via network. When a situation occurs where service of ATM should be stopped, the commissioned company and the bank can transmit a signal via a network to the controller 306 to stop the service from the communication unit 308. The ATM 301 includes other devices and processors except those from 302 to 311 such as a passbook printer, etc.

Generally, the CPU 101 and the internal bus 107 in FIG. 1 correspond to the controller 306 in FIG. 3. The controller 306 may be provided with own RAM and HDD.

The detailed description of the embodiments according to the present invention is given as follows.
<Embodiment of the Method for Adding a Numerical Sequence to Each Pixel Value of a Display Image>

First Embodiment

One embodiment according to the present invention is shown. According to the embodiment, an image conversion device receives an image generated by a display image generating device as an inputted image, generates a plurality of image groups, and stores the plurality of image groups in a image storage device. An image output device transmits an image to a display control device from the image storage device, the display control device displays the received image on an image display device. The image display device is an LCD monitor illuminated from back, for example, with backlight, and an image display device is visually recognized by a user with light emitted therefrom.

An information display device is described in the case of generating and displaying two images from one inputted image. The image to deal with is assumed to be an 8-bit gray image. The display image generating device does not need to generate a new image at all times, but stores an image generated previously in a memory provided separately and may transmit the image again. The display image generating device and the image conversion device may be connected with an image input terminal, however, since the devices are neither necessarily provided with the terminals and nor mounted in different packages, the devices may be connected through bus wiring instead of the image input terminal.

Figure 5:
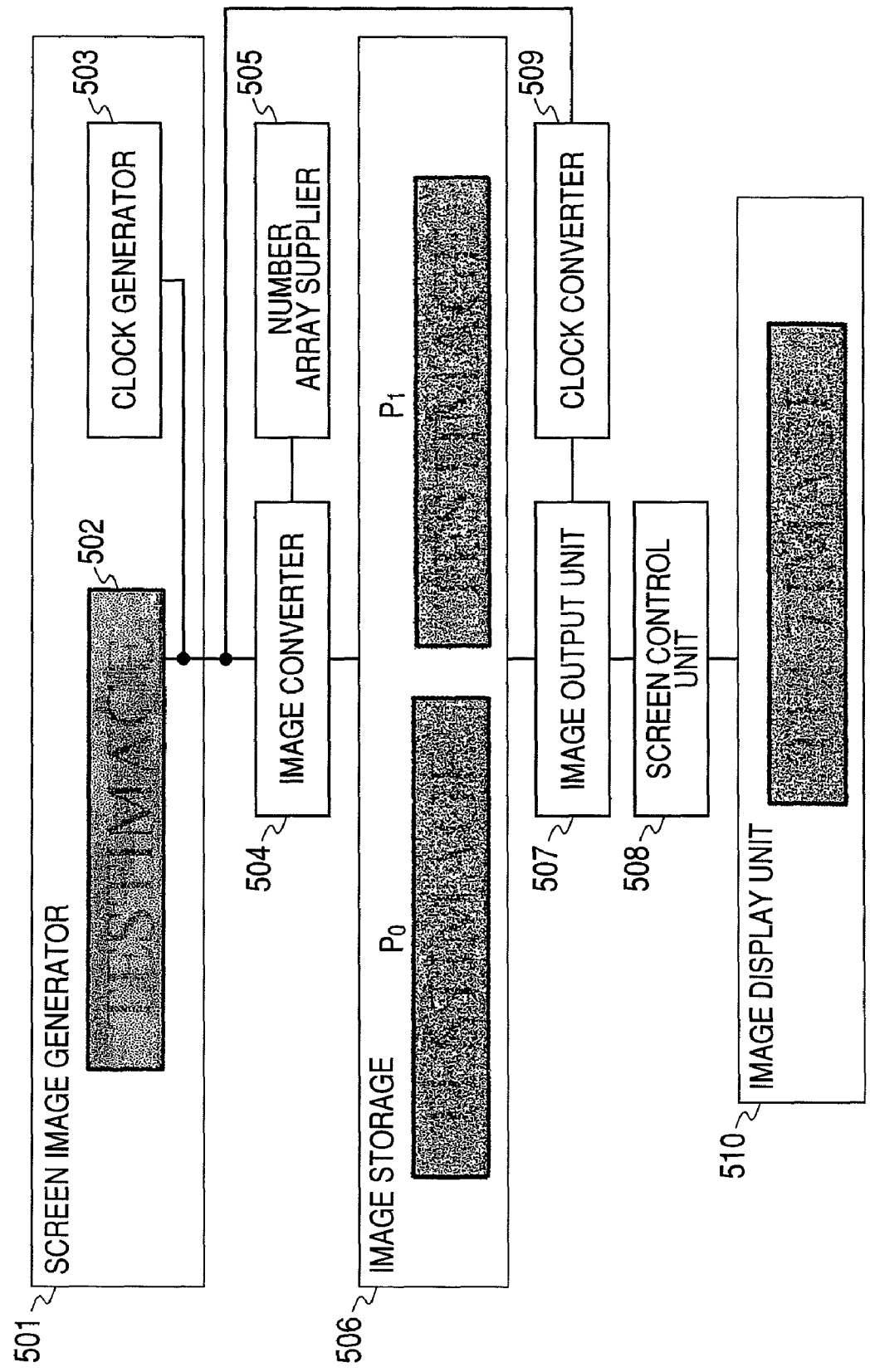
FIG. 5 is an image generation and configuration of a display.

Referring to FIG. 5, a screen image generator 501 generates an image I 502 to be displayed to the user, and transmits the image I to an image converter 504 together with a clock generated by a clock generator 503. The clock generated by the clock generator is a vertical synchronization signal, a horizontal synchronization signal, and a dot clock, etc. generally used when displaying by monitor, and when the screen control unit and the image display unit need only a part of these clock signals, the clock generator does not necessarily generate all these clocks and generates and transmits only required clocks. Among the transmitted image I and the clock information, the image I and the clock information are transmitted to the image converter 504 and the clock converter 509, respectively. The clock converter 509 generates a clock to be actually used by the screen control unit and the image display unit using the received clock information. Receiving the image I from the screen image generator, the image converter receives a numerical sequence from a number array supplier 505, and generates two images P0 and P1 and stores the two images in an image storage 506. The sequence s0 of the value acquired from the number array supplier is used for image conversion. Here, the s0 is a sequence with a value of 8 bits, for example, and the size is determined by the resolution of the input image I. If the input image I is an image with the size of XGA, 1024×768=307200 piece values are prepared. The s0 may be generated after receiving the image I, but sufficient number of values of s0 may be generated beforehand and recorded in the image storage. In order to improve in processing speed a plurality of number array supplier may be provided. The number array supplier supplies the value, which is larger than 0 and smaller than 1, and by calculating the value with the pixel value corresponding to the coordinates of the input image I a converted image is obtained. Here, calculation means that the first pixel value is obtained by calculating a function $f(I(x, y), s_0(x, y))$ with the input image pixel value $I(x, y)$ of coordinates $(x, y)$, and the value $s_0(x, y)$ of the numerical sequence as inputs, and the second pixel value is obtained by calculating another function $g(I(x, y), s_0(x, y))$ with the same values as inputs. The relation between the function f and the function g is determined depending on the display method, the display speed, or color characteristics of the image display unit. For example, in the case where two images P0 and P1 are displayed alternatively by switching in a short time, and if the display update rate of the image display unit is not dependent on a pixel value and is constant, and the color characteristics is linear as a function of the pixel values in the range 0-255, The set of the functions f and g can be obtained by setting function $g(I(x, y), s_0(x, y))=2\times I(x, y)-f(I(x, y), s_0(x, y))$. An example of the function f is given as $f(I(x, y), s_0(x, y))=I(x, y)\times s_0(x, y)$. Then, the corresponding function g is given by $g(I(x, y), s_0(x, y))=I(x, y)\times(2-s_0(x, y))$. In the case where the number array supplier generates the sine wave with the frequency k set as the sequence s0, that is $s_0(x, y)=(\sin(2\pi k(x+y*width))+1)/2]$ the frequency of variation of the horizontal pixel value in the first or the second image becomes a modulated frequency of the frequency of the pixel value of the input image I, thus making difficult for an interceptor to acquire the information about the input image I. where width as used in the above means the number of pixels of the breadth of the image I.

An image generated from the input image I and the noise patterns s0 is stored in the image storage 506. The image output unit 507 reads an image to be displayed on the image display unit from the image storage, and transmits the image to the screen control unit 508. A criterion when the image output unit chooses an image from the image storage is to take out in ascending order from the least address in the image storage, or to take out at random an image stored in the image storage using random numbers either from a random number generator provided with the image output unit or from an outside device. If the method to choose an image cannot be predicted from the outside, then the analysis by an interceptor can be blocked effectively. The screen control unit 508 controls an image display unit 510. As the image display unit 510 in FIG. 5, a usual monitor may be used such as a plasma monitor, an organic electroluminescence monitor, and electronic paper, as well as a CRT, an LCD, etc. In FIG. 5, the screen control unit acquires a clock for displaying an image on the image display unit via the clock inverter 509. This is because without using the clock from the clock generator 503 directly, but by further changing the clock, an image output rate can be set up according to an image input rate. That is, outputting speed of an image is higher than that of receiving an inputted image.

Figure 6:
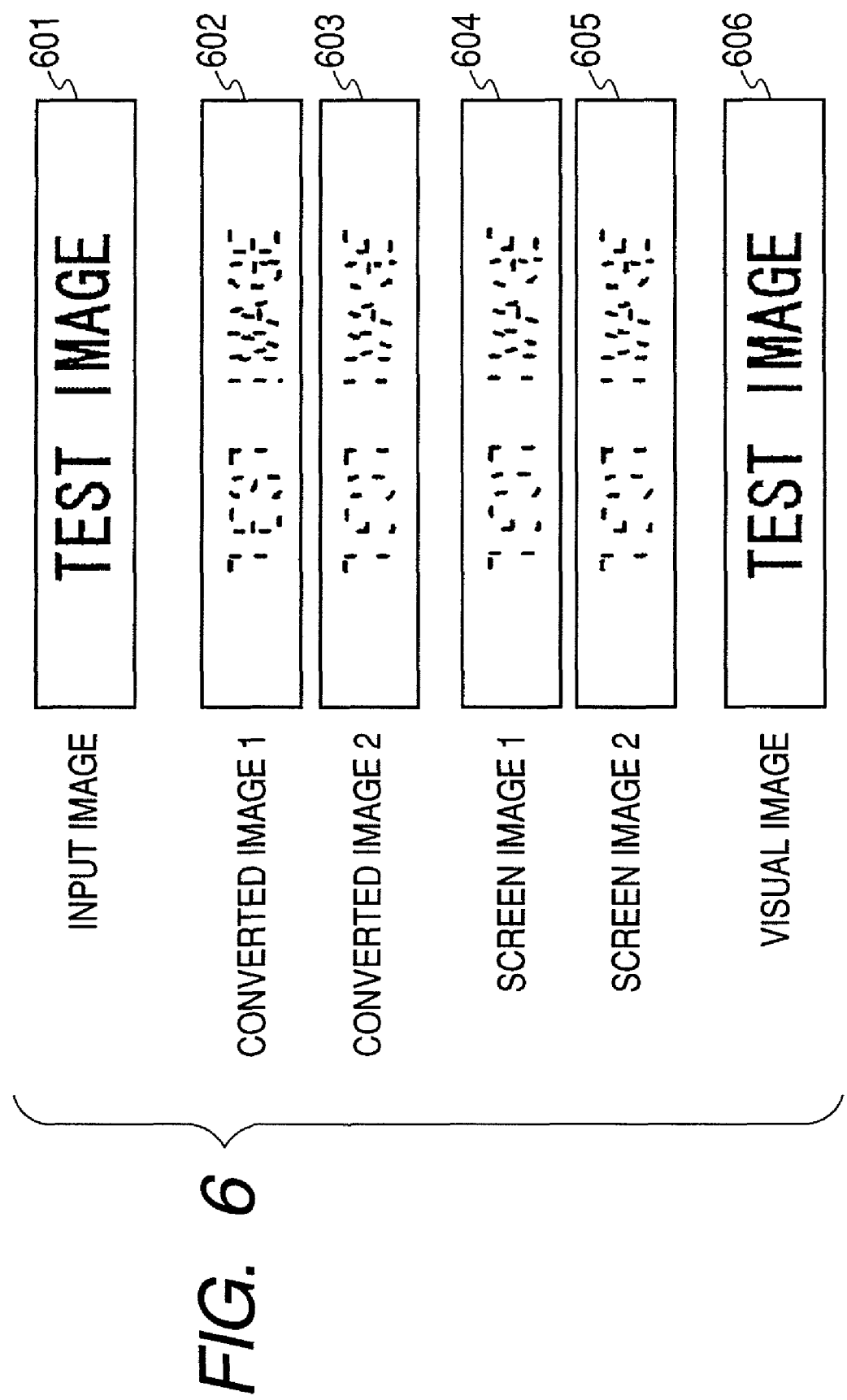
FIG. 6 is the relation of an input image, and converted image, a screen image, and a visual image.
Figure 7:
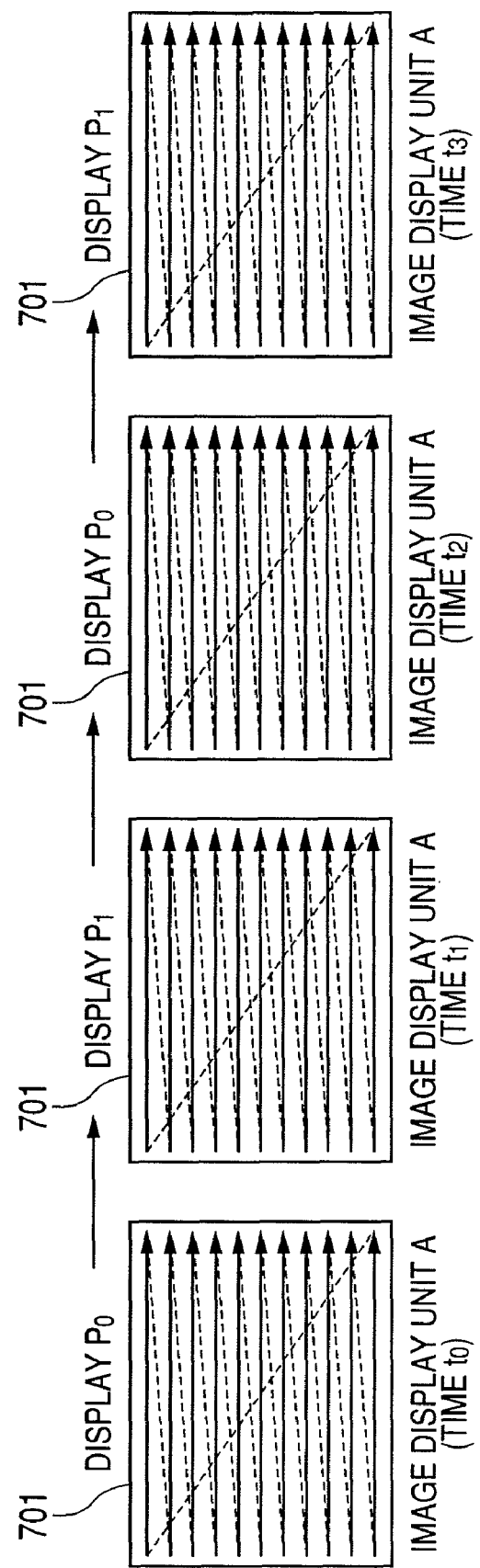
FIG. 7 shows the procedure to display converted images on an image display unit.

The relation of an input image, a converted image, a screen image, and a visual image is shown in FIG. 6. A converted image I (602) and a converted image 2 (603) are generated for an input image (601). Since the input image 601 is converted by using a numerical sequence obtained from the number array supplier, individual noticeability of a character string becomes worse for each of the converted images 1 and 2 compared with that of the input image. The converted images 1 and 2 are visually superposed and shown on the display unit. For example, the method of superposition is used by switching and displaying the images in a short time on one display. FIG. 7 shows an example of an aspect of the superposition. A first converted image P0 is displayed on a image display unit A 701 at a certain time t0, at the next time t1 the second converted image P1 is displayed, then at the next time t2 the first converted image P0 is displayed again, at the next time t3 the second converted image P1 is displayed again. If two images are displayed in this way, additive color mixing is realized with a brightness value viewed being equal to the average value of a plurality of display images. In the preparation method of functions f and g previously described, additive color mixing is assumed that an image equivalent to the input image I 606 is viewed (visual image) by switching over two generated converted images to show one to the other in a short time. However the display image 1 (604) or the display image 2 (605) on an image display unit is an image with deteriorated noticeability to the input image, and leakage electromagnetic waves are generated according to the display images so that images obtained by intercepting the leakage electromagnetic waves are very different from the visual image as a result.

Second Embodiment

Figure 8:
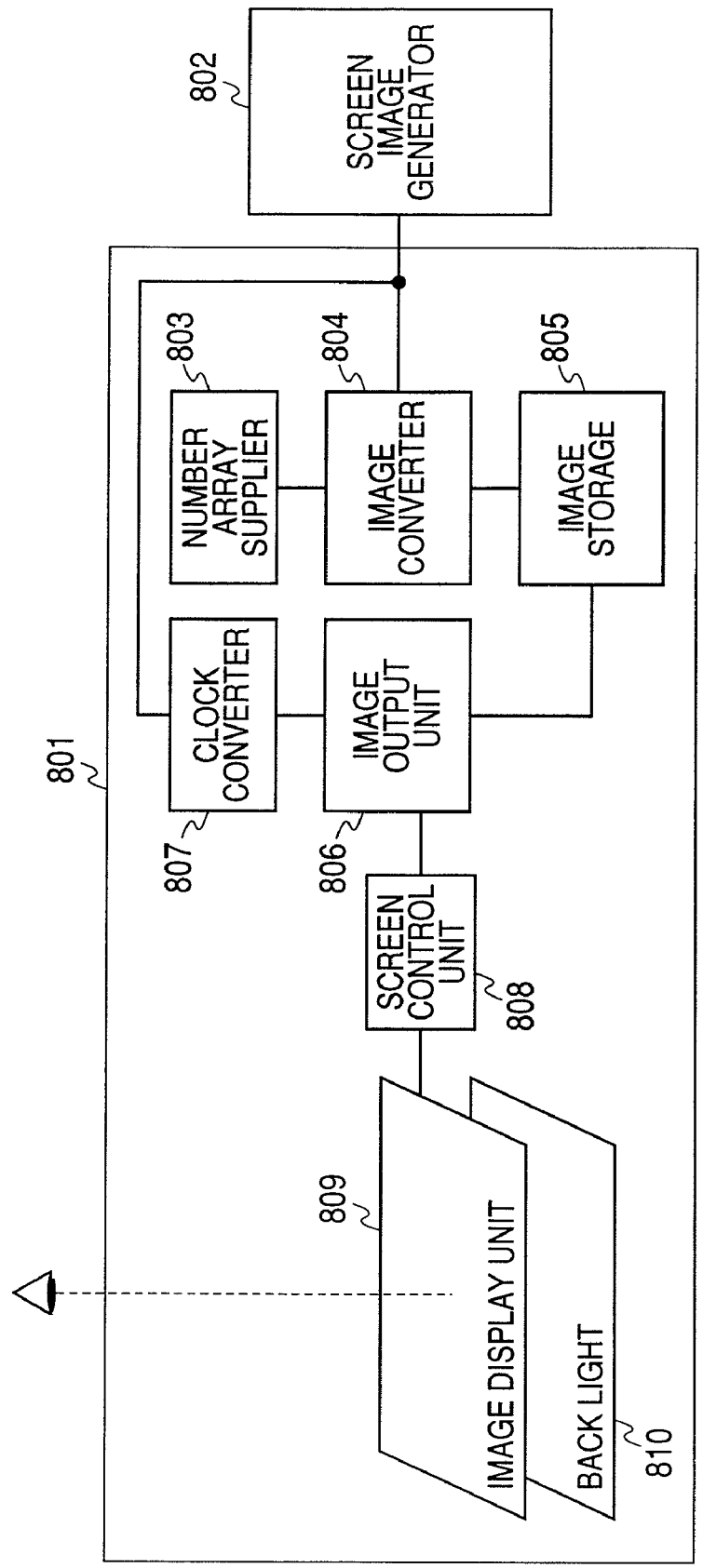
FIG. 8 shows a configuration of an information display device.

FIG. 8 shows an embodiment of the information display device according to the present invention. An information display device 801 of this embodiment receives an image I to be displayed to a user and clock information from a screen image generator 802. An image converter 804 generates two converted images $P_0$ and $P_1$, if the image I is received from a screen image generator. The numerical sequence $r_0$ obtained from a number array supplier 803 is used for generation of a converted image. Here, $r_0$ is a set of the random number value of 8 bits, for example, and the size is determined by the resolution of the input image I. If the input image I is an image with the size of XGA, 1024×768=307200 piece numerical values are prepared. These numbers may be generated after receiving the image I, but a sufficient number of numerical values may be generated beforehand, and recorded on a storage. In order to accelerate processing speed, a plurality of number array suppliers may be provided. A plurality of number array suppliers may be constituted such that a part of the suppliers receives a value from a true random number generating device, and another part receives a value from a pseudo random numbers generating device. A numerical value is assumed to take one of real numbers from 0 to 1. The image converter reads the pixel value from the coordinates (0, 0) corresponding to the upper left of the input image I in order toward the right. Arriving at the right end of the image, the converter moves to the following line and the pixel value is again read rightward from the left. The pixel value of the coordinates (x, y) in the input image I is denoted by I(x, y). That is, the pixel value at the upper left of the image I is I(0, 0). Similarly, the numerical sequence r0 also is rearranged into the form corresponding to each coordinates of the image I, or the numerical value used to the pixel value of the coordinates (x, y) of the image I is interpreted as $r_0(x, y)$. Similarly, the pixel value of the coordinates (x, y) of the image P0 is denoted by $P_0(x, y)$. The image converter reads I(x, y), in order to generate $P_0(x, y)$. If the pixel value is 8 bits, I(x, y) is either of the values from 0 to 255. Then, $\Delta(x, y)=|255-I(x, y)|$ is calculated. The absolute value of a value a is written as |a|. Next, defining as $\delta(x, y)=\min(\Delta(x, y), I(x, y))$, $\delta(x, y)$ is calculated. The value of δ thus obtained represents the amplitude of a noise used when the image converter according to this embodiment subtracts the noise from and adds to the I(x, y). That is, the first converted image is calculated as $P_0(x, y)=I(x, y)+\delta(x, y)*r_0(x, y)$. Next, the second converted image is calculated as $P1(x, y)=I(x, y)-\delta(x, y)*r_0(x, y)$. By processing all the coordinates (x, y) similarly in the following, two converted images P0 and P1 are acquired from the input image I and the numerical sequence $r_0$. $P_0$ and $P_1$ are once recorded on an image storage 805.

Next, an image output unit 806 transmits P0 and P1 recorded on the image storage to a screen control unit 808. In this case, the image output unit outputs P0 and P1 stored in the image storage in this order. Or receiving a random number from the random number generating device the image output unit may determine to transmit which of P0 and P1 to the screen control unit. Such a selection method can be implemented by storing as a table the start address of the image storage which stores $P_0$ and $P_1$, and calculating the offset from the head of the table using the above-mentioned random number. If this method is used of outputting $P_0$ and P1 in this order, the method has an advantage that after generating P0, an image can be outputted without waiting for the completion of generation of P1. If the method of choosing and outputting at random is adopted, since the method can make it difficult for a third party to predict the image to be displayed next when indicating the converted image which was generated once and recorded on the image storage by reuse, so that the effect is acquired that the analysis of leakage electromagnetic waves is very difficult. The screen control unit 808 controls an image display unit 809 to display the image received from the image output unit 806 using a conversion clock received from the image output unit 806 outputted from a clock inverter 807. With a screen image, the screen image generator 802 unites the clock information of a horizontal synchronization signal, a vertical synchronization signal, and a dot clock, etc., and transmits to the information display device 801. The information display device 801 separates received display image information and clock information, and the display image information is inputted into the image converter 804, and the clock information is inputted into the clock inverter 807. Since the horizontal synchronization signal, the vertical synchronization signal, R image signal, G image signal, and B image signal are transmitted with independent wiring if a cable is a VGA standard, it is easy to separate a clock (a horizontal synchronization signal and a vertical synchronization signal) and image information (R image signal, G image signal, B image signal). Since clock information and image information are transmitted by different wiring also with the DVI cable, separation is easy. Assuming A is an arbitrary integer equal to or larger than 30, the clock inverter 807 generates and outputs a clock from a clock F [Hz] using a PLL circuit, etc. with a speed A/F times faster than F (Hz). The number A corresponds to the number of the converted images displayed per second, and in order to perform superposition of the screen images visually by exchange display, the value of A is required to be 30 or more. Although there is no special restriction to the maximum for A, since the afterglow time in the fluorescent screen of CRT is about 1 ms, the maximum of A is considered to be enough as 1000 or less. For example, when the number of the converted images to be generated is two, a good result is obtained if referred to as A=60. Since a general screen image generator transmits a image with a speed of 60 Hz or less, all the input images can be converted and outputted satisfactorily.

The converted images P0 and P1 are displayed to a user on the image display unit 809 with a backlight 810 irradiated from back. If P0 and P1 are replaced with each other in a short time and displayed, the image displayed to a user is as what is superposed, and the pixel value of the averaging value of $P_0$ and $P_1$ is visually observed. Although calculated with $\delta(x, y)=\min(\Delta(x, y), I(x, y))$ here, it is good also as $\delta(x, y)=\min(\alpha, \Delta(x, y), I(x, y))$ with a certain value alpha. By setting a value smaller than the average value of I(x, y) as α, it is possible for the result not to depend on I(x, y) too much. This means that the information about the input image contained in the image outputted is reduced further. That is, it means that the desirable characteristic is obtained from a viewpoint of preventing the information interception from leakage electromagnetic waves.

If a pre-processing is performed so that I(x, y) may not take the value near 0 or 255, the disturbance effect by a noise can be strengthened. As a simple method, the method of converting the value of I(x, y) as a×I(x, y)+b can be used. Here, a is a real number, greater than 0 and less than one, and b is a natural number. If assumed as a=0.8 and b=20, the image can be converted to the one in which a pixel value takes 20 to 224. If the calculation result of a pixel value is not an integer, the pixel value is change into the nearest integer. If a gradation sequence is increased artificially using a dither method, degradation of the image quality due to the fall of a gradation number can be suppressed. Although the random number value is 8 bits in the above, in order to express smoother gradation sequence, the number of bits may be increased. And although the random number is assumed to be real numbers from 0 to 1, the random numbers may be rational numbers or integers from 0 to $\delta(x, y)$ after calculating $\delta(x, y)$. The random numbers are not necessarily generated in real time, and many integer random numbers of each range are generated and stored in a table format beforehand, required random numbers may be pulled out from a table.

Third Embodiment

Next, processing is described in the case where the image converter generates three converted images P0, P1, and P2 from one input image I received from the screen image generator. The number array supplier supplies the image converter with a numerical sequence obtained from the random number generator and stored internally. The image converter receives the numerical sequences $r_0$ and $r_1$. The size of $r_0$ and $r_1$ is dependent on the input image I. In the case where the input image I has the size of SVGA, 800×600=480000 pieces of numerical value are made for each $r_0$ and r1 to have.

Let the numerical values of r0 and r1 be real numbers from 0 to 1. Here, $\Delta(x, y)=|255-I(x, y)|$ is assumed. The following relations are assumed or definitions are used. $\delta(x, y)=\min(\Delta(x, y), I(x, y))$, $P_0(x, y)=I(x, y)+\delta(x, y)*r_0(x, y)$. $\sigma(x, y)=\min(\Delta(x, y), I(x, y))-\delta(x, y)*r_0(x, y)$. And lastly $P_1(x, y)=I(x, y)+\delta(x, y)*r_1(x, y)$, and $P_2(x, y)=I(x, y)-(\delta(x, y)*r_0(x, y)+\delta(x, y)*r_1(x, y))$ at the last. Thus, the three converted images $P_0$, $P_1$, and $P_2$ are generated, and a result is stored in the image storage. The information display device of the embodiment according to the present invention transmits three converted images to the screen control unit one by one using the image output unit. The order of transmitting P0, P1, and P2 may be determined using the random number obtained from the random number generating device, or from the least of the memory address of the image storage. Similarly, the case where more than three converted images are generated can be also implemented.

Although an image of the image storage is desirably regenerated newly whenever used once, but when there is restriction of processing speed or power consumption, the same converted image group may be continuously used over a certain period of time. FIG. 8 shows an embodiment according to the present invention wherein the backlight 810, assumed to be an LCD monitor, is disposed at back of the image display unit 809. However, a spontaneous lights type display, such as a CRT or an organic electroluminescence, may be sufficient as an image display unit, and there is no necessity of having backlight in that case.

Fourth Embodiment

An embodiment according to the present invention is shown in case that an input-output image is a color image. The case where the two converted images $P_0$ and $P_1$ are generated from the input image I is described.

An image converter decomposes the inputted color image into three planes of RGB. Next, the numerical sequence used by each plane $r_0$, $r_1$, and $r_2$ are received from the number array supplier. The size of $r_0$, $r_1$, and $r_2$ is determined depending on the resolution of the input image I. If the input image I is in XGA size constituted from 1024×768 dots, then each of $r_0$, r1, and r2 is arranged to have 786432 numerical values, respectively. These values are 8 bits in value, for example, and assumed to be real values from 0 to 1. The pixel value of the coordinates (x, y) in the R plane of the image I is denoted by IR(x, y). Similarly those in the G and B plane are denoted by IG(x, y) and IB(x, y), respectively. As for the image P0, the pixel values of the coordinates (x, y) in the R, G, and B planes are denoted by $P_0R(x, y)$, $P_0G(x, y)$ and $P_0B(x, y)$, respectively. And as for the image P1, the pixel values of the coordinates (x, y) in the R, G, and B planes are denoted by P1R(x, y), $P_1G(x, y)$, and $P_1B(x, y)$, respectively. The following processing may be performed one by one or in parallel, since the processing in each plane is executed independently in the information display device of the present embodiment.

The image converter reads IR(x, y), in order to generate $P_0R(x, y)$. The pixel value of each plane is assumed to be 8 bits. Then, $\Delta R(x, y)=|255-IR(x, y)|$ is calculated (255 is the maximum of 8 bit values without sign). Next, $\delta R(x, y)=\min(\Delta R(x, y), IR(x, y))$ is assumed. $\delta R(x, y)$ represents the amplitude of the noise which can be subtracted and added to IR(x, y). Then, $P_0R(x, y)$ is given by $P_0R(x, y)=IR(x, y)+\delta R(x, y)-r_0(x, y)$ using $r_0(x, y)$. By calculating similarly for each (x, y), $P_0R$ is obtained. Similar processing is performed in the G and B planes, respectively. That is, about G plane, $\Delta G(x, y)=|255-IG(x, y)|$ is calculated, and $\delta G(x, y)=\min(\Delta G(x, y), IG(x, y))$ is assumed, and then $P_0G(x, y)=IG(x, y)+\delta G(x, y)-r_1(x, y)$. About B plane, $\Delta B(x, y)=|255-IB(x, y)|$ is calculated, and $\delta B(x, y)=\min(\Delta B(x, y), IB(x, y))$ is assumed, and $P_0B(x, y)=IB(x, y)+\delta B(x, y)-r_2(x, y)$. Thus, the RGB plane of the image P0 is calculated. The RGB plane of the image P1 is similarly generated independently. The image P1 is obtained by calculating $P_1R(x, y)=IR(x, y)-\delta R(x, y)-r_0(x, y)$, $P_1G(x, y)=IG(x, y)+\delta G(x, y)-r_1(x, y)$, and $P_1B(x, y)=IB(x, y)-\delta B(x, y)-r_2(x, y)$.

Similarly as in the case of a gray image processing, a pre-processing is performed so that the pixel values in each plane may not take the value near 0 or 255, and that by restricting the magnitude of the amplitude of a noise to be subtracted or added, the information about the input image I can be more efficiently concealed. And degradation of image quality can be controlled by artificially increasing gradation sequence using the dither method. Although the values of r0, r1, and r2 are assumed to be real numbers from 0 to 1, the values may be limited to rational numbers, or after $\delta R(x, y)$, $\delta G(x, y)$, and $\delta B(x, y)$ are determined the values may be decided to take integers in the range from 0 to $\delta R(x, y)$, from 0 to $\delta G(x, y)$, and from 0 to $\delta B(x, y)$. $r_0$, $r_1$, and $r_2$ may be generated by different methods, respectively.

Fifth Embodiment

Assuming the gradation number of an input image to k, an embodiment is described where the numerical values supplied by the number array supplier take the values larger than −k and less than or equal to k. An input and output images are assumed to be gray images. The image converter of this embodiment generates the two converted images P0 and P1 from the input image I and two numerical sequences. The input image is assumed to be an arrangement of m×n (m and n are natural numbers), and the numerical sequence supplied by the number array supplier is assumed also to be an arrangement of m×n numbers. The values of the coordinates (x, y) of the first numerical sequence are denoted by r0(x, y), those of the second numerical sequence by r1(x, y). The coordinates (x, y) of the input image I are denoted by I(x, y). As for the two converted images $P_0$ and $P_1$, the values of coordinates (x, y) are denoted by $P_0(x, y)$, and $P_1(x, y)$, respectively.

The number array supplier sets the values larger than −k and equal to or less than k to $r_0(x, y)$ using a random number generator. For all coordinates (x, y), $r_1(x, y)$ is calculated as $r_1(x, y)=r_0(x, y)$. Here, since $r_1(x, y)$ is equal to $r_0(x, y)$ with opposite sign, there is no need to have all the values on the memory storage and even if $r_1(x, y)$ is generated from $r_0(x, y)$ at the time of outputting, processing speed is hardly spoiled. The image converter calculates $p=I(x, y)+r_0(x, y)$ first in order to acquire the values of the first converted image. When p is larger than k, assuming $P_0(x, y)=k$, and p' is calculated as p'=p*k. When p is smaller than 0, assuming $P_0(x, y)=0$, and p' is set to p'=p. Next, in order to acquire the values of the second converted image, $q=I(x, y)+r_1(x, y)+p'$ is calculated. If q is larger than k, $P_1(x, y)$ is set to P1(x, y)=k. If q is less than 0, $P_1(x, y)$ is set to $P_1(x, y)=0$. Or computation order of $P_0(x, y)$ and $P_1(x, y)$ is reversed. That is, $q=I(x, y)+r_1(x, y)$ is calculated. If q is larger than k, $P_1(x, y)$ is set to $P_1(x, y)=k$, and q'=q*k is calculated. If q is less than 0, $P_1(x, y)$ is set to $P_1(x, y)=0$, and q' is set to q'=q. Next, $p=I(x, y)+r_0(x, y)+q'$ is calculated. If p is larger than k, $P_0(x, y)$ is set to $P_0(x, y)=k$. If p is less than 0, $P_0(x, y)$ is set to $P_0(x, y)=0$. Furthermore, the system is constituted such that both may be switched over to the other at random. Since the numerical value added to the input image I is not dependent on the size of the pixel value of the input image I, the method of this embodiment can strengthen the disturbance effect on a converted image.

Sixth Embodiment

In the fifth embodiment the gray image processing is described, a similar processing can be also performed with a color image. When an input image is in RGB color, the image converter performs processing by decomposing the image is into RGB planes. Calculation in each plane is the same as that of the above-mentioned gray image. The case is described where two converted images $P_0$ and $P_1$ are generated from the input image I. The image converter of this example decomposes the input color image into three planes of RGB. Next, numerical sequence used in each plane: $rr_0$, $rr_1$, $rg_0$, $rg_1$, $rb_0$, and $rb_1$ are received from the number array supplier. The size of $r_0$, $r_1$, and $r_2$ is determined depending on the resolution of the input image I. If the input image I is the XGA size which is composed of 1024×768 dots, $rr_0$, $rr_1$, $rg_0$, $rg_1$, $rb_0$, and $rb_1$ have 786432 numerical values, respectively. These values are 8 bits in value, for example, and when the gradation number of the input image is set to k, generated to be one of the integers larger than −k and equal to or less than k. The pixel value of the coordinates (x, y) in the R plane of the image I is denoted by IR(x, y). Similarly those in the G and B planes are denoted by IG(x, y) and IB(x, y), respectively. Also as for the image $P_0$, the pixel values of the coordinates (x, y) of R, G, and B planes are denoted by $P_0R(x, y)$, $P_0G(x, y)$ and $P_0B(x, y)$, and as for the image $P_1$, the pixel values of the coordinates (x, y) of R, G, and B planes are denoted by $P_1R(x, y)$, $P_1G(x, y)$, and $P_1B$. In the information display device of this embodiment, since the processing is performed in each plane independently, the following processing may be performed either one by one or in parallel.

The number array supplier sets the values larger than −k and equal to or less than k to $rr_0(x, y)$, $rg_0(x, y)$, and $rb_0(x, y)$ for all the coordinates (x, y) using a random number generator. For all the coordinates (x, y), calculation is performed as $rr_1(x, y)=rr_0(x, y)$, $rg_1(x, y)=rg_0(x, y)$, and $rb_1(x, y)=rb_0(x, y)$. An image converter calculates $p=I(x, y)+rr_0(x, y)$ first, in order to acquire the value $P_0R(x, y)$ of the first converted image in the R plane. If p is larger than k, $P_0R(x, y)$ is set as $P_0R(x, y)=k$, and p'=p*k is calculated. If p is smaller than 0, $P_0R(x, y)$ is set as $P_0R(x, y)=0$, and p' is set as p'=p. Next, in order to acquire the value P1R(x, y) of the second converted image in the R plane, $q=I(x, y)+rr_1(x, y)+p'$ is calculated. If q is larger than k, $P_1R(x, y)$ is set as $P_0R(x, y)=k$. If q is less than 0, $P_1R(x, y)$ is set as $P_1R(x, y)=0$. Or the calculation order is reversed for $P_0R(x, y)$ and $P_1R(x, y)$. That is, $q=I(x, y)+rr_1(x, y)$ is calculated. If q is larger than k, $P_1R(x, y)$ is set as $P_1R(x, y)=k$, and q'=q*k is calculated. If q is smaller than 0, $P_1R(x, y)$ is set as $P_1R(x, y)=0$, and q' is set as q'=q. Next, $p=I(x, y)+rr_0(x, y)+q'$ is calculated. If p is larger than k, $P_0R(x, y)$ is set as $P_1R(x, y)=k$. If p is less than 0, $P_0R(x, y)$ is set as $P_0R(x, y)=0$.

In order to acquire the value $P_0R(x, y)$ of the first converted image in the G plane, $p=I(x, y)+rg_0(x, y)$ is calculated. If p is larger than k, $P_0G(x, y)$ is set as $P_0G(x, y)=k$, and p'=p*k is calculated. If p is smaller than 0, $P_0G(x, y)$ is set as $P_0G(x, y)=0$, and p' is set as p'=p. Next, in order to acquire the value $P_1G(x, y)$ of the second converted image in the G plane, $q=I(x, y)+rg_1(x, y)+p'$ is calculated. If p is larger than k, $P_1G(x, y)$ is set as $P_1G(x, y)=k$. If q is less than 0, $P_1G(x, y)$ is set as $P_1G(x, y)=0$.

In order to acquire the value $P_0B(x, y)$ of the first converted image in the B plane, $p=I(x, y)+rb_0(x, y)$ is calculated. If p is larger than k, $P_0B(x, y)$ is set as $P_0B(x, y)=k$, and p'=p*k is calculated. If p is smaller than 0, $P_0B(x, y)$ is set as $P_0B(x, y)=0$, and p' is set as p'=p. Next, in order to acquire the value $P_1B(x, y)$ of the second converted image in the B plane, $q=I(x, y)+rb_1(x, y)+p'$ is calculated. If q is larger than k, $P_1B(x, y)$ is set as $P_1G(x, y)=k$. If q is less than 0, $P_1B(x, y)$ is set as $P_1B(x, y)=0$.

The order of calculation for the first converted image and the second converted image may be changed as in the calculation in the R plane.

Seventh Embodiment

Figure 9:
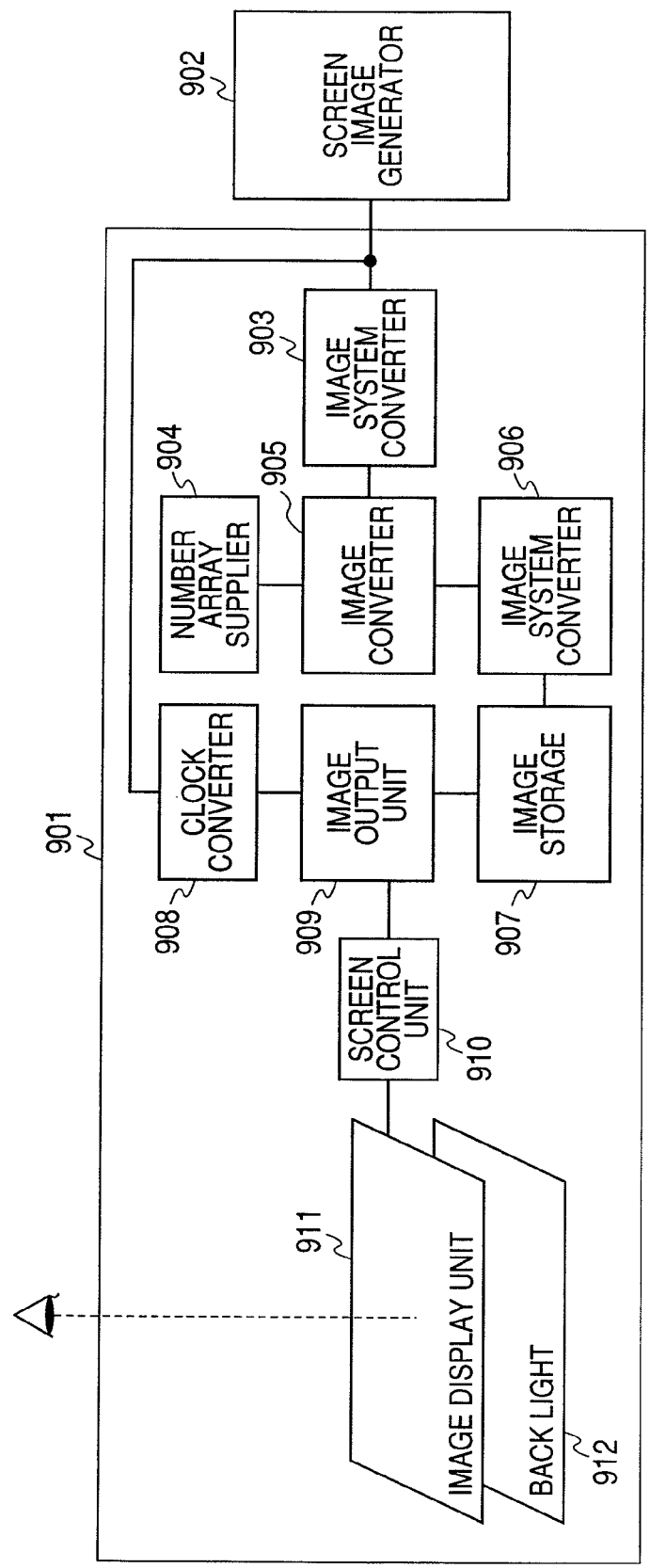
FIG. 9 shows a configuration of an information display device provided with an image system converter in accordance with an embodiment of the present invention.

FIG. 9 shows an embodiment according to the present invention in the case where an image system converter is provided. An information display unit 901 of the present embodiment receives an input image I from a screen image generator 902, and generates a color system converted image from the color system of the input image by using a first image system converter 903, and an image converter 905 generates a converted image by computing a numerical sequence supplied from a number array supplier 904 and the color system converted image, a second image system converter 906 converts the converted image into the same color system as the input image I, and records the converted image on an image storage 907. The image recorded on the image storage is outputted to a screen control unit 910 using an image output unit 908. The screen image generator 902 outputs a clock together with the screen image used by the screen control unit and the image display unit to display an image, and receiving the clock the information display unit 901 separates the clock and the image, and inputs the clock into a clock inverter 908. The clock inverter outputs a conversion clock resulted from the conversion to an image output unit 909. The image output unit 909 outputs the conversion clock to the screen control unit 910 together with an output image. The screen control unit controls an image display unit 911 using the input image and the clock information, and displays the image to a user. The image display unit 911 of the information display unit 901 according to the present embodiment assumes a light transmission type display such as a liquid crystal, and includes a backlight 912; however, if the image display unit is a spontaneous light type, such as a CRT, a device equivalent to the backlight 912 is not necessarily required. The image system converter of the present embodiment includes the first image system converter for converting the color system of the input image, and the second image system converter for converting the color system of the converted image outputted from the image converter; however, two image system converters are not always required and one image system converter may implement both functions of the two.

Since the image system converter can be process each pixel of the input image I independently, the image system converter may be constituted so that the color system of only some pixels may be changed. For example, since RGB color space and a CMY color space are mutually in complementary color relation, an equivalent effect of exchanging order of generating the first converted image and the second converted image can be realized by switching the order of processing in the RGB color space and in the CMY color space.

<Embodiment of the Method for Encoding a Display Image in a Different Basic Pixel Unit>

Eighth Embodiment

One embodiment is described of the information display device in accordance with the present invention. First, an image generating device is described in the case where two images are generated from one input image. The case is described where an input image I is a binary monochrome image.

Figure 13:
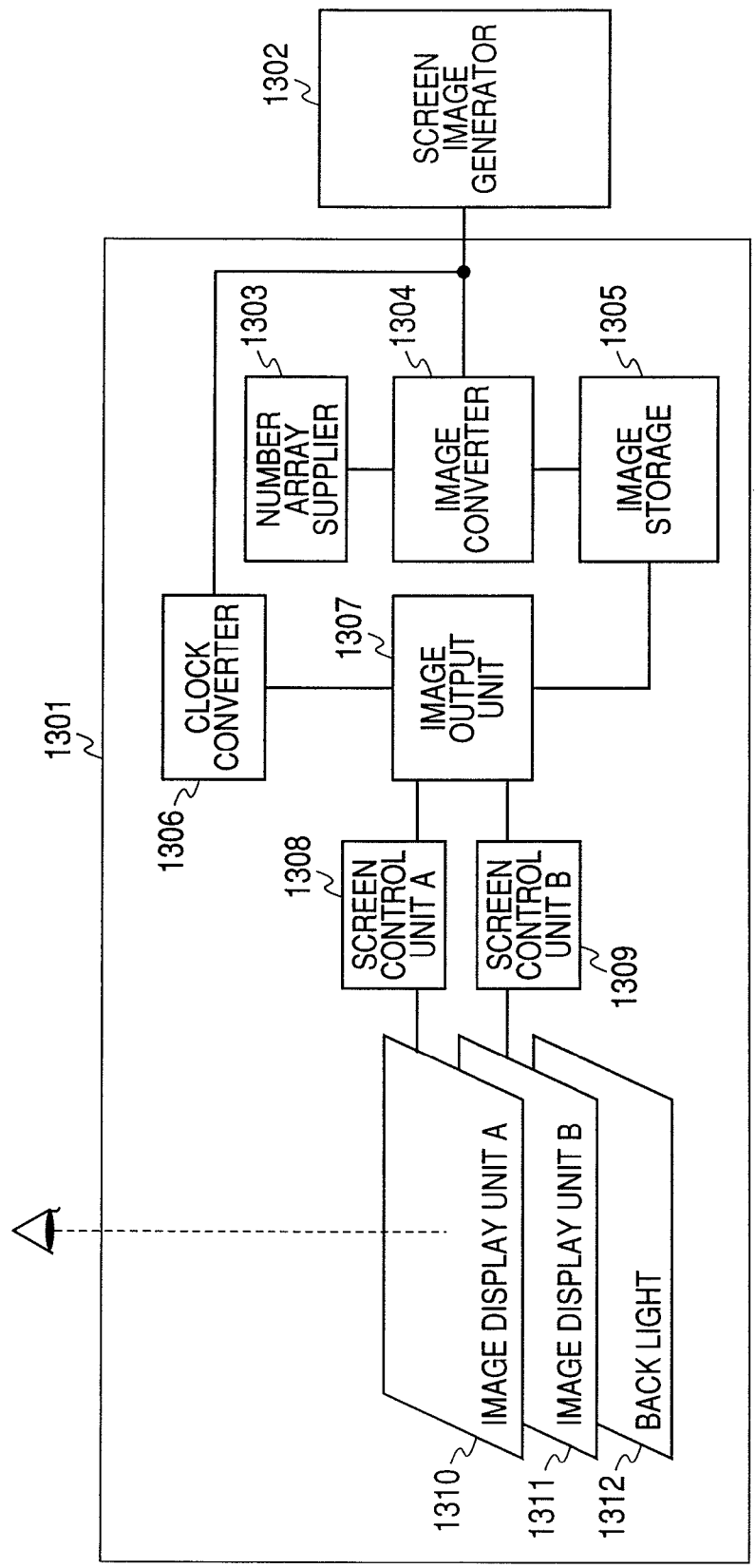
FIG. 13 shows a configuration of an information display device provided with two image display units in accordance with an embodiment of the present invention.

FIG. 13 shows an information display device of this embodiment. The information display device 1301 of this embodiment has a number array supplier 1303, an image converter 1304, an image storage 1305, an image output unit 1307, a clock inverter 1306, a first screen control unit 1308, a first image display unit 1310, a second screen control unit 1309, a second image display unit 1311, and a backlight 1312.

The image converter receives a numerical sequence r0 from the number array supplier with which the information display device is provided. Here, the size of r0 is equivalent to the pixel number of the input image I inputted from a screen image generator 1302, and if the input image I is an image of XGA size, it has 786432 (=1024×768) random number values. The numerical value of r0 is 0 or 1. The pixel value of the coordinates (x, y) of the input image I is denoted by I(x, y), and r0 is made to correspond to the same coordinates of the input image I, and is denoted by $r_0(x, y)$. Two converted images outputted are referred to as $P_0$ and $P_1$, respectively, and when referring to the pixel value of the coordinates (x, y), the pixel values are represented by $P_0(x, y)$ and $P_1(x, y)$, respectively. The image converter reads the value of $r_0(0, 0)$, and if the value is 0, and records the information (0:1) for $P_0(0, 0)$ in the image storage 1305.

Figures 10, 11:
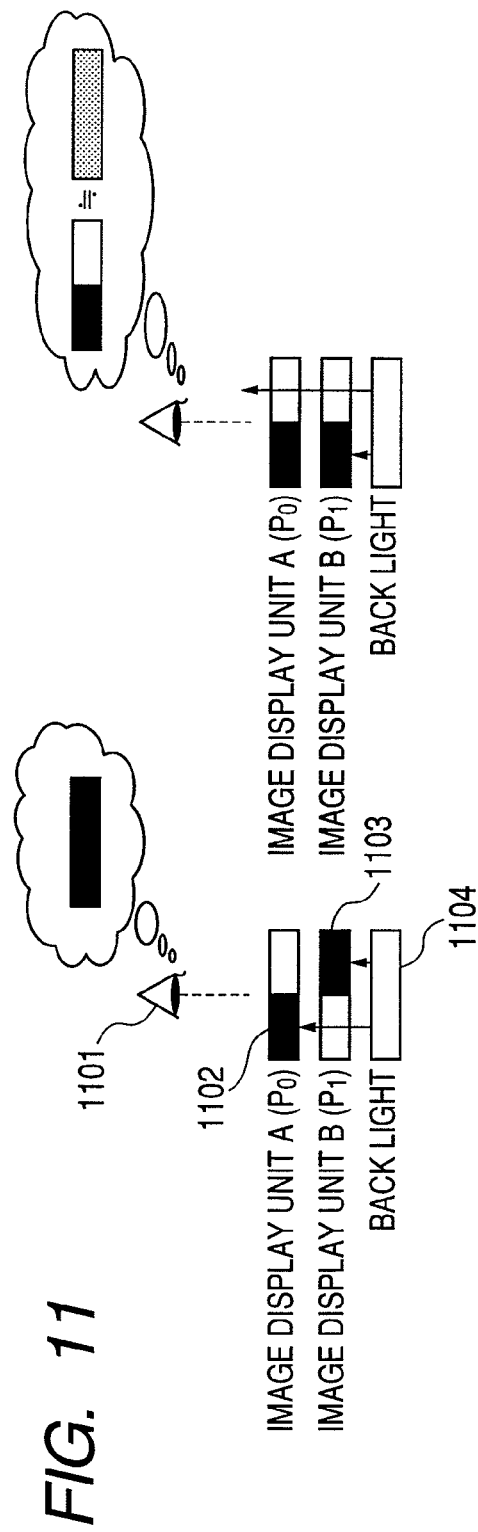
FIG. 10 is a conversion table of an input image and a numerical sequence to the output image.
FIG. 11 shows a relation of the color of an outputted image and visual color.

The image converter of this embodiment differs in the resolution of the input image I, and the resolution of the generated image. Here, an example is shown where the image converter is constituted such that the resolution of the converted image P0, and P1 in the x axis direction i.e., a transverse direction, is twice as good as that of the input image I. The information of the above (0:1) means that when the pixel value 0 corresponds to white and the pixel value 1 corresponds to black, the pixel values corresponding to coordinates (x, y) are converted to 2 pixels of a row with left 0, right 1, i.e., white and black. FIG. 10 shows the relation of the values of the input I(x, y), $r_0(x, y)$ to the image converter, with the values of $P_0(x, y)$, $P_1(x, y)$ outputted therefrom. Above described (0:1) denotes a pixel with two pixels 1001 constituted from black and white, and (1:0) represent a pixel with two pixels 1002. Such a pixel as a pixel with two pixels is called a template in the present specifications. A template constituted from 2 pixels has an arrangement of 2×1. In the information display device of the present embodiment according to the present invention, s×t/2 pixels are set to 0 and the remaining s×t/2 pixels are set to in the template with an arrangement of s×t pixels as an encoding method. Therefore, the template with an arrangement of 2×1 is two kinds, white and black or black and white. In the information management method in which template information is recorded in each coordinates of an converted image as mentioned above, the resolution of $P_0$ or $P_1$ in the transverse direction is set up beforehand twice as large as that of the input image I, and instead of recording the above (0:1), 0 and 1 may be stored in $P_0(0, 0)$, and $P_0(1, 0)$, respectively. In this case, two pixel values of the coordinates (2x, 2y), (2x+1, 2y) of the converted image be determined from the pixel values of the coordinates (x, y) of the input image and the numerical values of the coordinates (x, y) of the numerical sequence.

Next, I(0, 0) is read, if the value is 0, (0:1) is recorded for $P_1(0, 0)$, and if the value is 1, (1:0) is recorded for P1 (0, 0). This is the assignment matched with the result that if the value of I(0, 0) is 0, i.e., white, the result of superposition of $P_0(0, 0)$ and $P_1(0, 0)$ is optically (0:1), looked for a user as a black-and-white row. On the other hand, if the value of 1(0, 0) is 1, i.e., black, the result of superposition of $P_0(0, 0)$ and $P_1(0, 0)$ is optically (1:1), looked for a user as a deep black row. As a result, if the value of I(0, 0) is 0, i.e., white, looked for a user as black and white, and if I(0, 0) is 1, i.e., black, looked for a user as deep black.

If the value of the random number $r_0(0, 0)$ is 1, (1:0) is recorded for $P_0(0, 0)$. If the pixel value of I(0, 0) is 0, i.e., white, (1:0) is recorded for $P_1(0, 0)$, if the pixel value of I(0, 0) is 1, i.e., black, (0:1) is recorded for P1(0, 0). Also in this case, by displaying $P_0(0, 0)$ on the first image display unit and displaying $P_1(0, 0)$ on the second image display unit, the result of superposition if the pixel value of I(0, 0) is 0, i.e., white, looks black and white, and if the pixel value of I(0, 0) is 1, i.e., black, looks deep black. In the image converter according to the present embodiment, the outputted pair of $P_0(x, y)$ and $P_1(x, y)$ to the input pair of I(x, y) and $r_0(x, y)$ are shown in FIG. 10. Similarly in the following, the image converter calculates $P_0(x, y)$ and $P_1(x, y)$ to all the (x, y) coordinates, and stores the result in an image buffer.

Next, an image output unit 1307 transmits $P_0$ and $P_1$ currently recorded on an image storage 1305 to a first screen control unit A 1308 and a second screen control unit B 1309, respectively. When the format of the converted image currently recorded on the image storage is the format which records template information, template data is assigned to each coordinates and made to output an image. In this case, the converted image $P_0$ is transmitted to the first screen control unit, and $P_1$ is transmitted to the second screen control unit. Or an image output unit may choose the transmission destination of the converted image $P_0$ from either the first or the second screen control unit at random using the random number obtained from the random number generator, and transmit P1 to a different screen control unit from $P_0$.

Figure 12:
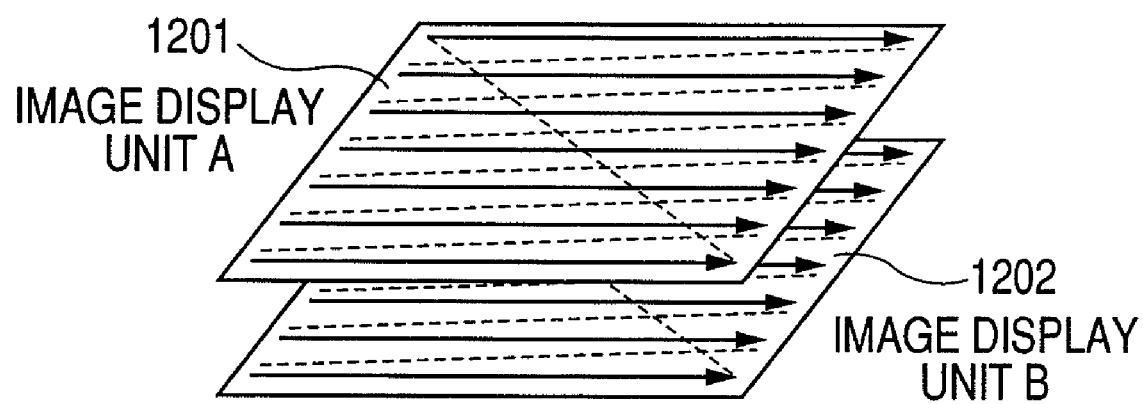
FIG. 12 shows physical relationship of two image display units in an information display device.

The first screen control unit and second screen control unit display the images received from each image output unit on each image display unit. FIG. 11 shows the images viewed by a user when the coordinates (x, y) of the converted images generated above are displayed by the present information display device. A first converted image 1102 is displayed on a first image display unit 1310, and a second converted image 1103 is displayed on a second image display unit 1311. A backlight 1104 is assumed to be the same as a backlight 1312 of FIG. 13. If the pixel size of display image of the first and second image display units is small enough, since a user views the average value of adjacent pixels, black and white are viewed as gray. If the image display unit is a light transmission type as shown in FIG. 12, If the image displayed on the first image display unit 1201 is black i.e., contents which prevent the penetration of a back light, the image viewed by the user is black without depending on the contents of the image displayed on the second image display unit 1202. If the image displayed on the first image display unit 1201 is white i.e., contents which allow the penetration of a back light, the black or white which is the contents of the image displayed on the second image display unit is displayed. That is, as shown in FIG. 11, the image is recognized by the user a little distant from the display surface as if equivalent to the input image I constituted from black or gray.

Here, equivalent to the input image I means that with encoding performed by the information display device number of pixels of the input image I in the transverse direction is increasing twice, and the white pixel element of the input image I looks to be a gray pixel so that the input image I is not reproduced completely but an image with equivalent information is obtained.

Ninth Embodiment

When a change of the aspect ratio of an image is not preferred, a method may be used to assign a template of 2×2 arrangement to an input pixel. Or when the input image I is received from the screen image generator, the image converter may change the resolution of the input image I in the transverse direction into one half as a pre processing. When the input image I has redundancy in the transverse direction, simply thinning out a half the lines may be enough. When simple thinning is not preferred, reduction of the amount of information can be suppressed by spreading the pixel value information on the line to be deleted to the pixels adjoining in the transverse direction.

A case is described where a template of 2×2 arrangement is assigned to an input pixel.

The number array supplier 1303 supplies a numerical sequence $r_0$ of n×m individual values to the image converter 1304 for the input image I with the size of n×m (n and m are natural numbers). The numerical sequence r0 is a sequence of the numerical values, each takes 0 or 1. An image converter 1304 reads the pixel value I(x, y) of the coordinates (x, y) of the input image I, and the numerical value $r_0(x, y)$ corresponding to the coordinates (x, y) of the numerical sequence r0. The image converter processes from the coordinates (0, 0) to coordinates (n−1, m−1) of the input image I one by one or in parallel as follows. The image converter of the embodiment according to the present invention assigns the information (0:1:1:0) to P0(x, y), if the value of $r_0(x, y)$ is 0 as shown in FIG. 14. Here, (0:1:1:0) denotes a matrix with two rows and two columns. (Equivalent functions can be realized by expanding the size of P0 twice both in the x direction and in the y direction, and assigning as $P_0(2x, 2y)=0$, $P_0(2x+1, 2y)=1$, $P_0(2x, 2y+1)=1$, and $P_0(2x+1, 2y+1)=0$). The functions described above is expressed with picture images as shown in FIG. 14, wherein a pixel 1401 corresponds to (0:1: 1:0), and a pixel 1402 corresponds to (1:0:0:1). When (0:1:1: 0) is assigned to $P_0(x, y)$, and if the value of I(x, y) is 0, i.e., white, (0:1:1:0) is assigned to $P_1(x, y)$. On the other hand, if the value of I(x, y) is 1, i.e., black, (1:0:0:1) is assigned to $P_1(x, y)$. The image converter generates the converted images $P_0$ and $P_1$ similarly in the following, and records the converted images in the image storage 1305.

The image output unit 1307 reads $P_0$ and $P_1$ recorded in the image storage 1305, and outputs $P_0$ and $P_1$ with the conversion clock received from the clock converter 1306 to the screen control unit A 1308 and the screen control unit B 1309. The screen control unit A and the screen control unit B display each received images to the image display unit A 1310, and unit B 1311, respectively. In the information display device of the present the light transmission type display is used as the image display units A and B, and reversing the backlight 1312 the images displayed on the image display unit A and the image display unit B are viewed by the user.

Since the converted images P0 and P1 are each binary images, if either is 1, i.e., black, the light from backlight will be intercepted as the example of FIG. 12, and recognized by the user as a black pixel. If both are 0, i.e., white, the light from the backlight penetrates and is recognized by the user as a white pixel. If the value of I(x, y) is 0, i.e., white, when the converted images $P_0$ and $P_1$ are superposed, the superposition pattern of the template is set to (0:1:1:0) or (1:0:0:1), and has a composition that 2 pixels are black and 2 pixels are 0. If the pixel size of the image display unit is small enough, the pixel is viewed by the user as if not to be a combination of a white and a black pixels but a gray pixel. If the value of I(x, y) is 1, i.e., black, the superposed pattern of the template is set to (1:1:1:1) and 4 pixels all serve as black. That is, the pixel is recognized by the user as a black pixel. Accordingly, the user can observe the color corresponding to I(x, y) using the information display device of the present embodiment. Although only (1:0:0:1) and (0:1:1:0) are shown here as a template to be used, the combination of (0:0:1:1) and (1:1:0:0) may also be used, and if the combination is made such that two pixels are set to 0, and the other two to 1 among four pixels, any combination may be used as far as contrast between black and white is obtained when P0 and P1 are superposed. As for the template of 2×2, other than the above (1:0:1:0) and (0:1:0:1) can be used. That is, there are three kinds of templates of 2×2. The present embodiment shows an example wherein only the templates of (0:1:1:0)) and (1:0:0:1) are used for generating a pair of converted images. However, different templates may be used for every pixel of the input image I. For example, since if a template to be used is changed at random for every pixel of the input image I, the pattern of electromagnetic waves to be generated is further disturbed so that the example is a preferable embodiment for preventing interception of leakage electromagnetic waves.

The above described image conversion method is based on a vision decoding type secret dispersion method by Naor and Shamir (abbreviated to the NS method below), (M. Naor, A. Shamir, and "Visual Cryptography" EUROCRYPT' 94, LNCS 950, pp. 1-12, Springer-Verlag, 1995). In the NS method, an image of one sheet is divided into the images of two or more sheets, called shares, and the original information is acquired optically if the shares printed each on transparent sheets, such as OHP are superposed.

The NS method indicates that no information about an original image from a single share is leaked. In the information display device of the embodiment according to the present invention, since an image is displayed on a rewritable image display unit instead of a medium rewriting thereof is impossible such as an OHP, even when displaying the same image, the information interception by leakage electromagnetic waves can be effectively prevented by using a new share for a display created using a different random number within a short period. Conventionally, in the method of presenting an image using a computer, since a plurality of shares are combined to form an image of one sheet beforehand using a computer such as a CPU, and the connected image is displayed, the information about a connected image can be intercepted from the leakage electromagnetic waves when displaying the combined image. However, in the embodiment of the information display device according to the present invention, a combined image is not generated but formed using a user's vision, accordingly even if electromagnetic waves are intercepted, information does not leak out.

Tenth Embodiment

As shown in FIG. 8, an embodiment of the information display device provided with one image display unit according to the present invention is shown. The generating method of the converted images $P_0$ and $P_1$ is the same as that of the 8th or the ninth embodiment.

Since the number of image display units is only one in the present embodiment, the image output unit 806 alternately outputs the converted images P0 and P1 currently recorded on the image storage 805 to the screen control unit 808. The image output unit 806 also transmits the conversion clock outputted from the clock converter 807 to the screen control unit 808. Using the received conversion clock, the screen control unit controls the image display unit 809, and displays the received image.

When the converted image generation method and the display method of the present embodiment are used in the image displayed, averaging in color over space and time occurs. When two light transmission type displays are used and either of two pixel values is 1, i.e., black, a black pixel is recognized by the user, however, in the present display method due to the averaging generated by exchanging the display of $P_0$ and $P_1$ a black pixel is recognized only when both values are 1, i.e., black.

Only when both values are 0, i.e., white, a white pixel is recognized similarly as in the case of black. According to the NS method, When the pixel value of the input image I is 0, i.e., white, the templates used in the coordinates of the first converted image $P_0$ and the corresponding coordinates of the second converted image $P_1$ become the same, and when the pixel value of the input image I is 1, i.e., black, the templates used in the corresponding coordinates of the first converted image P0 and the second converted image P1 are different. Therefore, averaging in color over space occurs when the pixel value of the input image I is 0, and averaging in color over time occurs when the pixel value of the input image I is 1.

Consequently, in the information display device of the present embodiment the size of a pixel used for a display is enlarged to such an extent that visual averaging i.e., graying, does not take place between the adjacent pixels in the x direction or in the y direction. Thereby, only averaging over time occurs for graying the resulting image according to the pixel value of the input image I can be obtained. In order to enlarge the size of a pixel, the pixel of a display itself may be enlarged, and a similar effect can be acquired by expanding an image considering that a regular square with length and width of each 3 pixels etc. as 1 pixel. Since if a pixel with a side of about 0.01 mm or larger is used, graying is suppressed between adjacent pixels, averaging over time becomes hard to be acquired if pixel size is enlarged, it is desirable to use a pixel with a side of less than about 1 mm. In the above-mentioned embodiment, the number of the converted images generated by the image converter and the number of the image display units provided with the information display device are the same. Next, the case is described where the number of the image display units provided with the information display device is less than the number of the converted images generated by the image converter.

When the number of the image display units is less than the number of the converted images generated, the image output unit chooses a certain number of the converted images at random from the image storage matched to the number of image display units using the random number obtained from the random number generator. The selected image is transmitted to the screen control unit and the screen control unit displays the received image on the image display unit. At the next time, the image output unit chooses a certain number of images at random from the converted images stored in the image storage matched to the number of image display units using the random number newly obtained from the random number generator, and transmits to the screen control unit. By constituting the image display unit in this way, the probability that each image stored in the image storage is displayed per unit time becomes uniform, and the converted image group seems to be superposed visually for a user. Here, a converted image group can also be displayed in round, without using a random number. On the other hand, as for the image of three or more sheets, a visual deviation caused by the difference in a display order can be controlled by choosing the sheet at random. That is, the image can be displayed visually more stably by choosing and displaying the sheets at random.

When the number of the image display units is larger than the number of the converted images generated, the image output unit chooses at random the screen control unit the converted images are to be transmitted thereto using the random number obtained from the random number generator. Even if the image display unit is transparent, attenuation of a certain amount of transmitted light occurs. By choosing the image display unit to be used at random each time, the deviation of the brightness of a display image caused by such attenuation of light can be controlled. When attenuation of the transmitted light is so small and able to be neglected, it is not necessary to choose the image display unit at random as mentioned above every time.

That is, after determining at random the screen control unit for transmitting the generated image at a certain timing, the image display unit may be constituted so that the same correspondence relation is maintained for a certain period of time or a period decided by a random number generated by the random number generator. By doing in this way, it becomes not necessary to generate a random number every time or to eliminate the contents of a display used at a certain time and is not used at the next time, thereby enabling to reduce power consumption. Since reduction of power consumption leads also to reduction of the electromagnetic waves emitted, information leakage can be reduced as a result.

Figure 15:
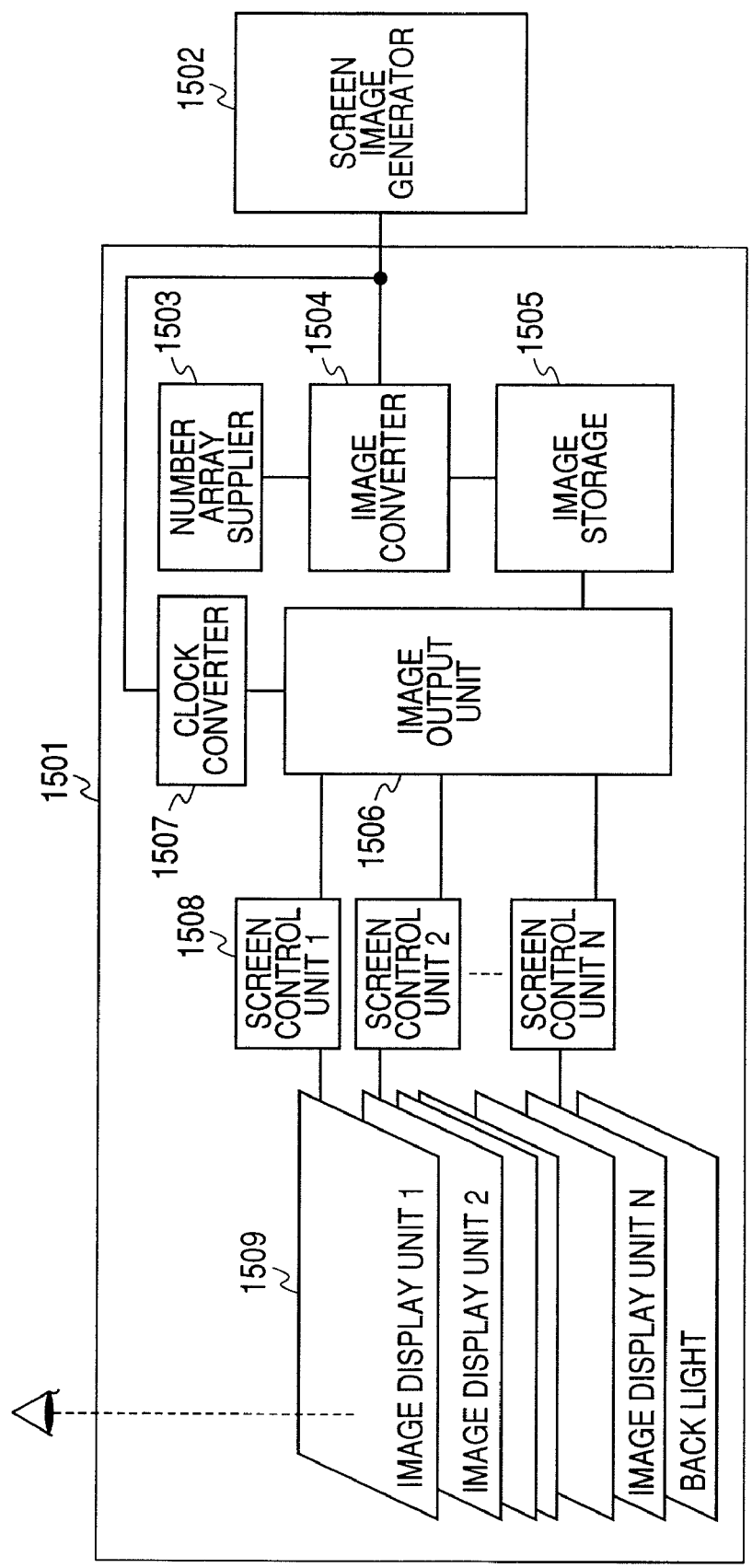
FIG. 15 shows a configuration of an information display device provided with a plurality of image display units in accordance with an embodiment of the present invention.

Thus an information display device can be constituted provided with arbitrary number of image display units as shown in FIG. 15. The information display device 1501 includes a number array supplier 1503, an image converter 1504, an image storage 1505, an image output unit 1506, a clock converter 1507, a plurality of screen control units 1508, and a plurality of image display units 1509. A display image and a clock are received from a screen image generator 1502, the display image is inputted into the image converter 1504, and the clock is inputted into the clock converter 1507. The image converter 1504 calculates the input image and M numerical (M is an integer larger than one) sequences obtained from the number array supplier 1503, generated, and records the M converted images in the image storage 1505. The M converted images may be generated from a single input image, or also may be generated from a plurality of input images. A general screen image generator transmits display images even if the images are identical, continuously according to the clock. Therefore, generating M converted images from the single input image may become equivalent to generating M converted images from a plurality of input images in some cases. The image output unit 1506 receives the conversion clock from the clock converter 1507, and outputs the clock to the screen control unit 1508 with the converted image read from the image storage 1505. The image display unit 1501 and the screen control unit 1502 are installed as a pair, and when N image display units (N is a natural number) are provided, N screen control units are similarly provided.

<Constitutional Variation>

In the information display device according to the present invention an embodiment is shown where an image display unit is provided to generate and output a plurality of converted images using a numerical sequence and a display image, the information display device can be also constituted that an existing image display unit is utilized.

Eleventh Embodiment

Figure 16:
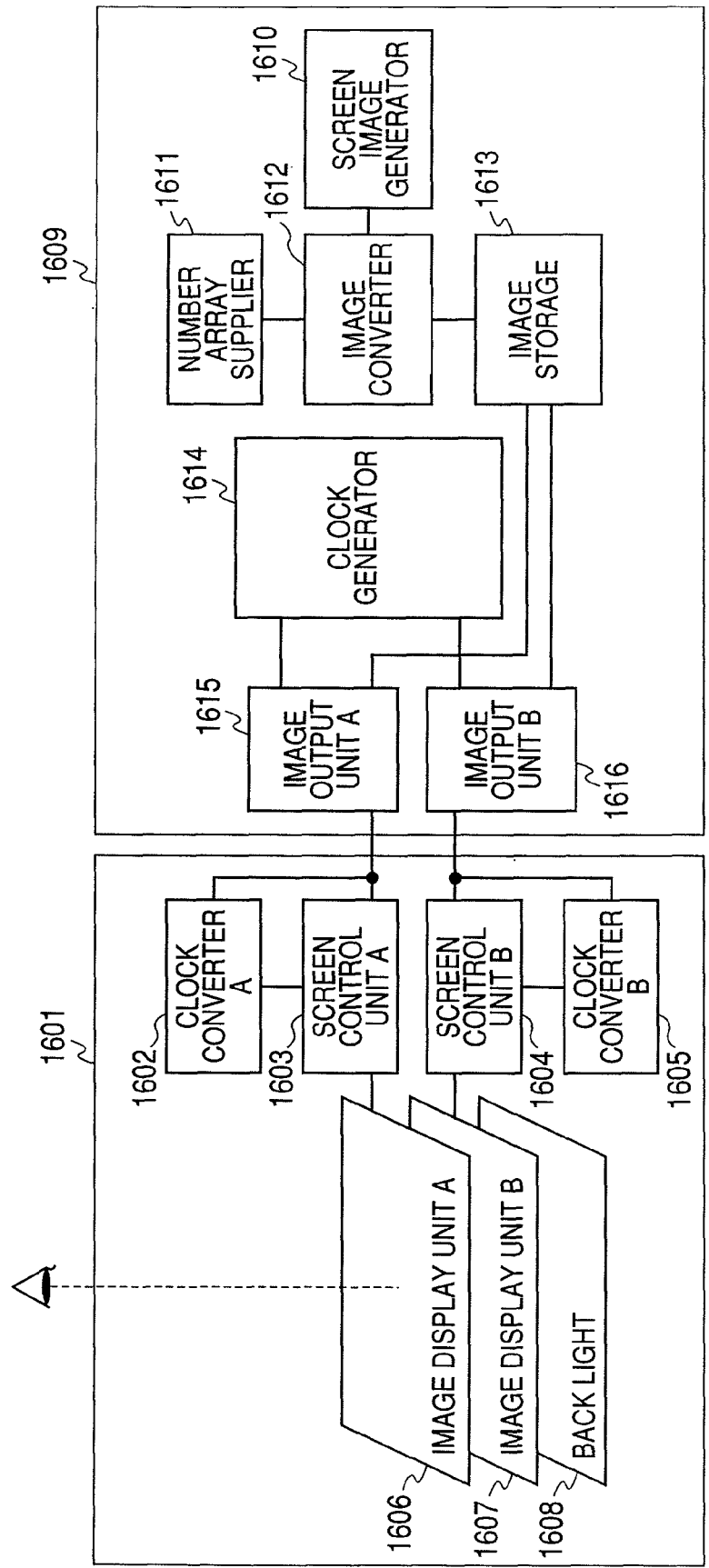
FIG. 16 shows a configuration of an information display device constituted from an image display unit and an image generator unit in accordance with an embodiment of the present invention.

FIG. 16 shows an embodiment of the information display device composed of an image display unit section 1601 and an image generating device section 1609. In the embodiment of the information display device section for generating an image to display and a section for displaying the image are separated, and a computer and a monitor in a common configuration of a computer are assumed. That is, the image display unit section corresponds to the monitor, and the image generating device section corresponds to the computer. In recent years, number of computers is increasing wherein an image processing function is installed as a dismountable expansion board, so that an image generating device may be of a form of a dismountable expansion board.

The image display unit section 1601 has a connection terminal for receiving an image to be displayed, and a function to display an input image. The image display unit part of the present embodiment has two image input terminals, and can receive two input images. A first screen control unit 1603 and a second screen control unit 1604 receive clocks converted by a first clock converter 1602 and a second clock converter 1605 based on the clock information transmitted with an inputted image, control a first image display unit 1606 and a second image display unit 1607, respectively, and display the received images to the display unit.

In the image generating device part 1609, first, a screen image generator 1610 generates a display image, and a number array supplier 1611 prepares a numerical sequence. The image converter 1612 receives the display image from the screen image generator, receives the numerical sequence from the number array supplier, and records a converted image converted from the display image in an image storage 1613. The image generating device part 1609 includes a clock generator 1614, and the output clock is inputted into a first image output unit 1615 and a second image output unit 1616, respectively. The first image output unit reads a first converted image from the image storage, and transmits the first converted image with the clock received from the clock generator. At the same time the second image output unit reads a second converted image from the image storage, and transmits the second converted image with the clock received from the clock generator. The image output units transmit the received image and clock to the image display unit section 1601, respectively.

Twelfth Embodiment

Figure 17:
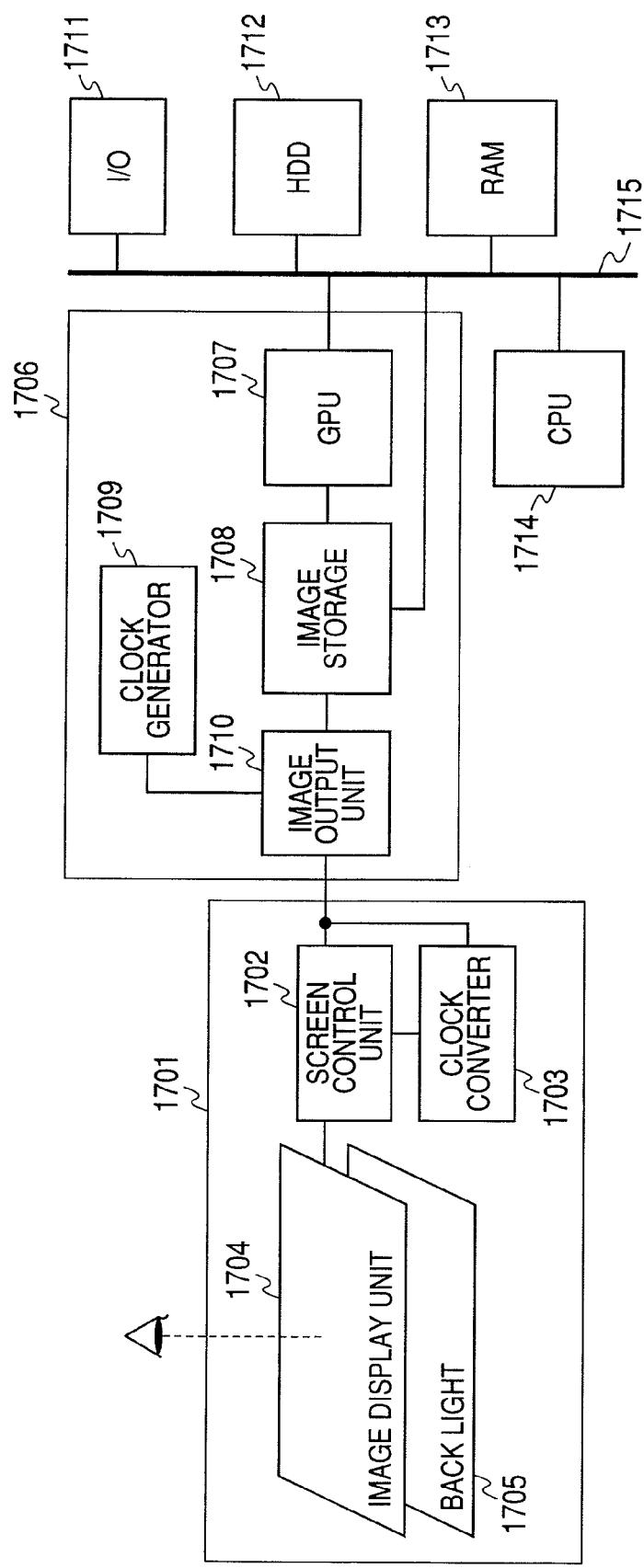
FIG. 17 shows a configuration of a computer with a graphics board.

FIG. 17 shows an embodiment of the information display device in more detail than in FIG. 2. The information display device of the present embodiment composed of a display 1701, a display, and a graphics board 1706 of a computer connected to an internal bus 1715. The display 1701 includes an image display unit 1704 for receiving an input image and displaying an output image, a screen control unit 1702 for controlling a backlight 1705 to display the image, and a clock converter 1703 a clock is inputted thereto and used for displaying the input image for generating the conversion clock for the screen control unit to determine the timing to control the image display unit and the backlight. The graphics board 1706 includes a GPU 1707 for performing image processing, an image output unit 1710, a clock generator 1709, and an image storage 1708. The graphics board 1706 includes a central processing unit CPU 1714, an input terminal, such as a keyboard, and an output terminal such as RS232C. An I/O 1711, a HDD 1712 holding a large capacity data, and a RAM 1713 primary storage, etc. are connected to the computer connected with the internal bus 1715.

A general computer including a notebook PC or even a mainframe computer often has a composition as shown in FIG. 17, and although a little difference may exist in composition, the embodiment of the present invention can be easily applied.

Figure 18:
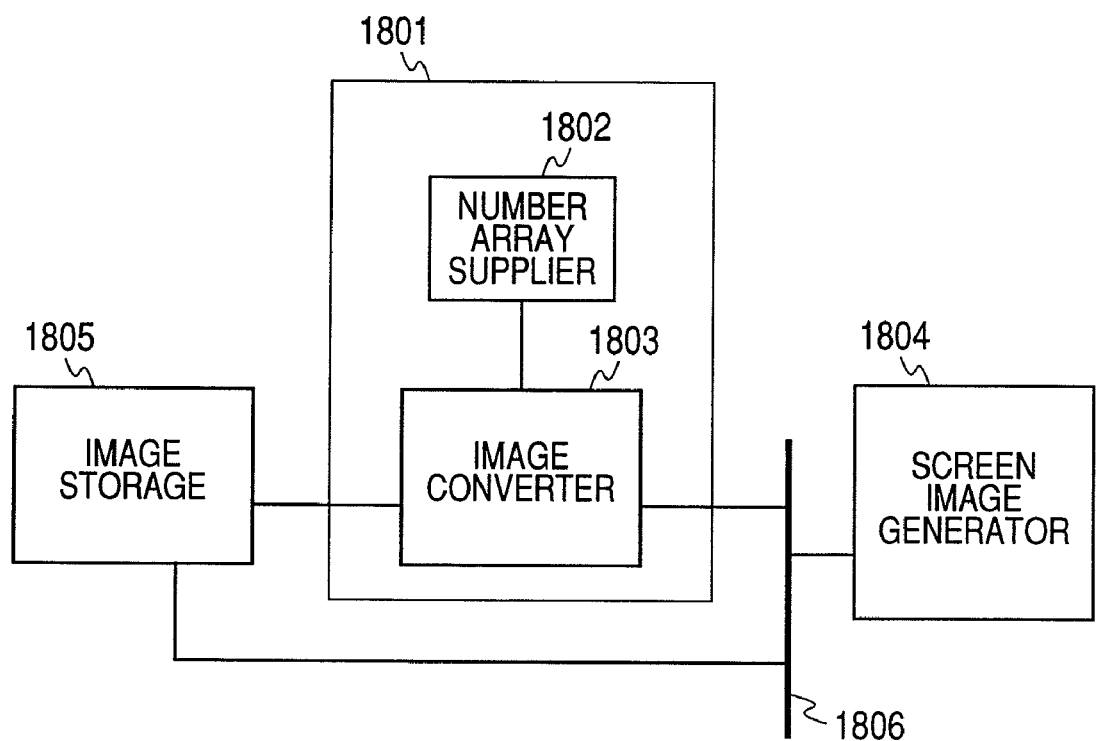
FIG. 18 shows a configuration of a GPU section.

An example of the configuration of GPU 1801 provided with the information display device according to the present invention is shown in FIG. 18. In the GPU 1801 of the embodiment according to the present invention, an image is directly inputted from a screen image generator 1804, or an image stored in an image storage 1805 beforehand by the screen image generator 1804 is used as an input image. The GPU has a number array supplier 1802 and an image converter 1803, the image converter receives a numerical sequence from the number array supplier, generates a converted image by computing the input image inputted either directly from the screen image generator or from those stored beforehand in the image storage, and records the converted image on the image storage 1805. Here, the screen image generator 1804 is connected to the GPU with an internal bus, or may be a CPU. The GPU is connected to an internal bus 1806, and able to receive a control signal enabling or disabling a function of generating an image measure against information leakage. By transmitting a control signal from CPU etc. which are similarly connected to the internal bus, it can restrict to a required period and a measure function can be enabled. By changing a function for a measure invalid to a system a measure is not necessary thereto, a device which not in use can be stopped and power consumption can be reduced. Each device may be software instead of hardware. In that case, required calculations can be made on the GPU, or partly can be performed by a CPU, or all the processing can be performed by the CP.

Figure 19:
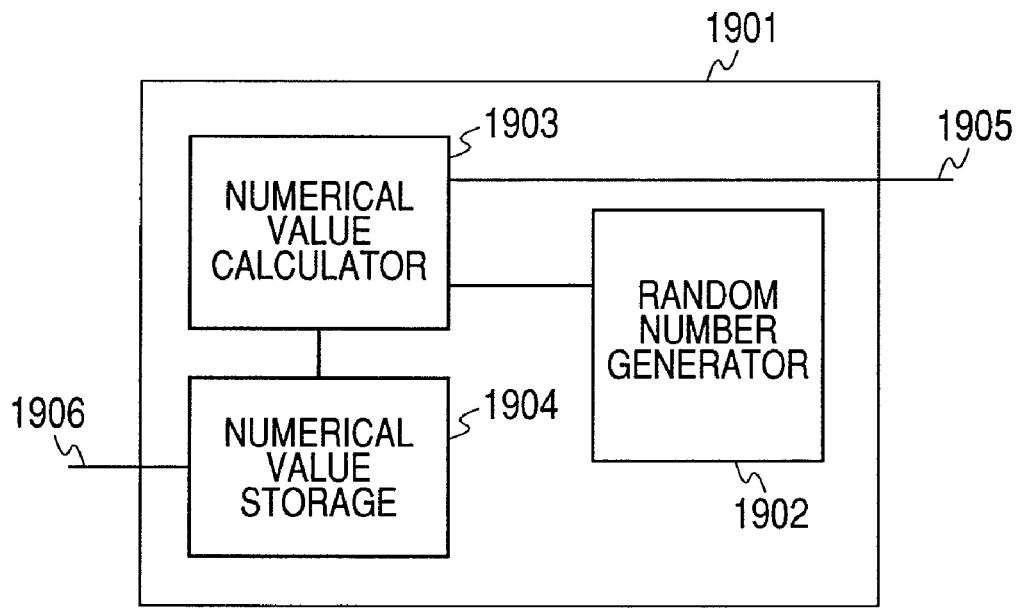
FIG. 19 shows a configuration of a number array supplier.

FIG. 19 shows an example of configuration of the number array supplier.

The number array supplier 1901 of this example has a numerical sequence arithmetic unit 1903, a random number generator 1902, and a numerical sequence memory storage 1904. The number array supplier also has a port 1905 for inputting a numerical sequence arithmetic unit control signal, and a port 1906 for outputting a numerical sequence to supply. The number array supplier 1901 starts outputting a numerical sequence by s start signal received from the control signal input port 1905. The numerical sequence arithmetic unit 1903 generates a new numerical sequence according to the values of the random number generator 1902 and the numerical sequence memory storage 1904, and records the new numerical sequence on the numerical sequence memory storage. The value of numerical sequence memory storage is outputted from the numerical sequence output port 1906. In some cases the numerical sequence memory storage may be configured that the numerical sequence memory storage has some numerical sequences set up beforehand, and outputs the numerical sequence to hold according to a control signal independently of the values of the numerical sequence generated by the random number generator or the numerical sequence arithmetic unit. In that case, neither a random number generator nor a numerical sequence arithmetic unit are necessarily provided. The random number generator may be not provided inside of the number array supplier 1901, but a connection port is mounted to the random number generator and inputted thereto from outside. As for a numerical sequence, it is desirable that the numerical values of the sequence cannot be predicted from the outside. Accordingly, the numerical sequence may be generated without necessarily using a random number generator.

Figure 20:
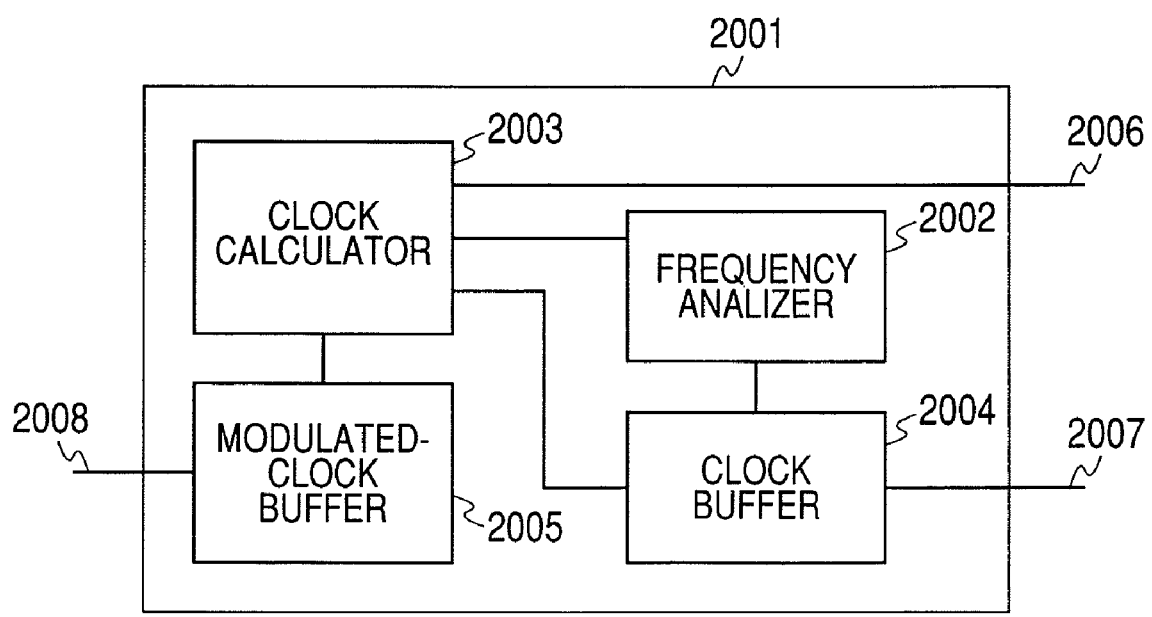
FIG. 20 shows a configuration of a clock converter.
Figure 21:
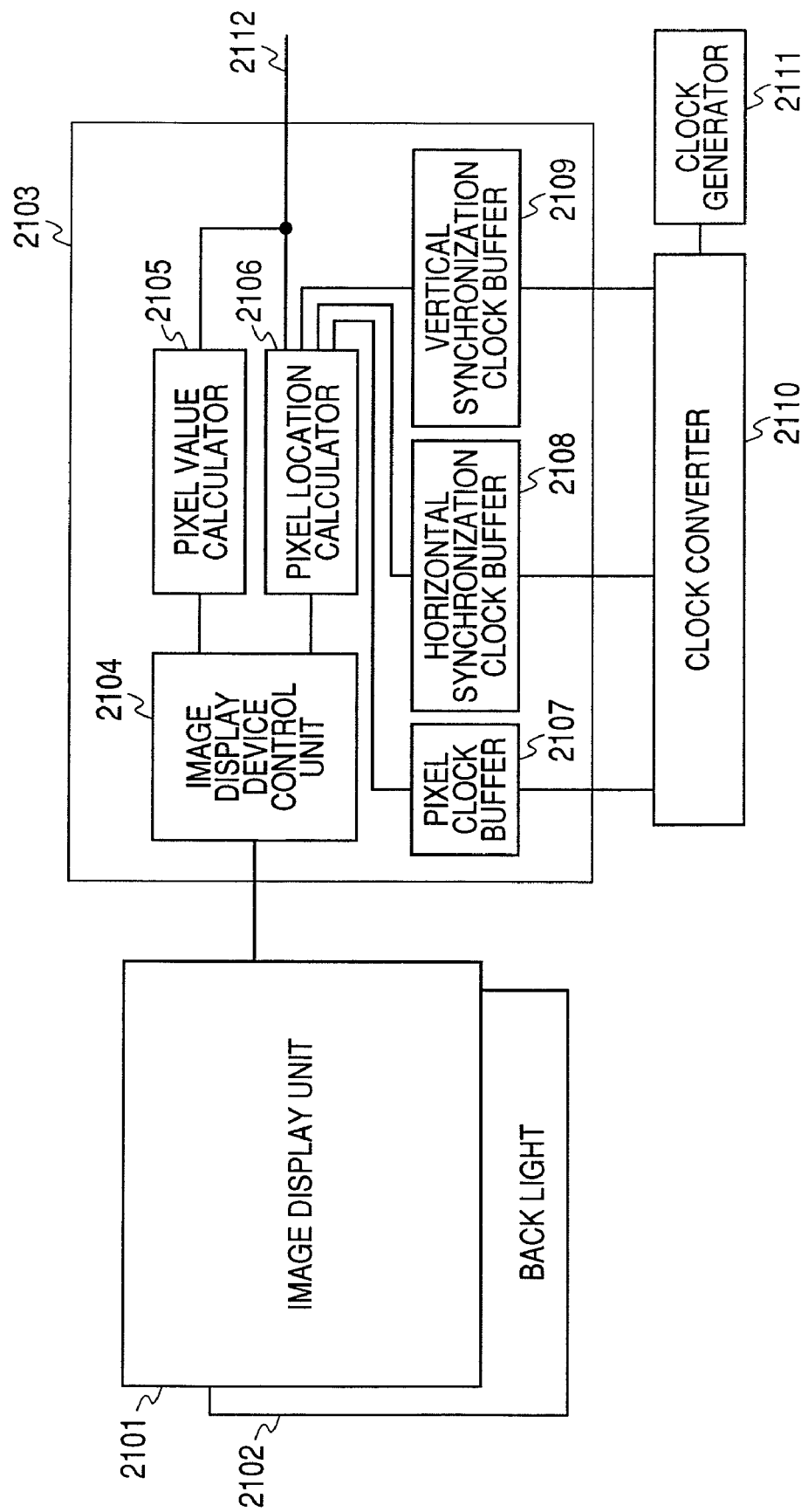
FIG. 21 shows a configuration of a screen control unit.

FIG. 20 shows an example of the configuration of the clock converter. A clock converter 2001 includes a clock arithmetic unit 2003, a frequency analyzer 2002, a clock buffer 2004, and a modulated clock buffer 2005. Furthermore, the clock converter 2001 includes a port 2006 for inputting a clock calculator control signal, a clock input port 2007, and a modulated-clock output port 2008. The clock converter analyzes the clock inputted from the clock input port 2007 and recorded in the clock buffer 2004 using the frequency analyzer 2002, arithmetic converts the clock of the clock buffer with a predetermined multiplying factor inputted from the clock calculator control signal input port 2006, and outputs the result to the modulated clock buffer 2005. The conversion clock recorded in the conversion clock buffer is outputted through the conversion clock output port 2008. When it is known that clock conversion is not necessary, the clock converter can be invalidated by setting up a clock calculator control signal from the input port 2006. FIG. 21 shows an example of the image display unit section having a screen control unit 2103, a clock converter 2110, a clock generator 2111, an image display unit 2101, and a backlight 2102. The screen control unit 2103 includes an image display device control unit 2104, a pixel value calculator 2105, and a pixel location calculator 2106. And the screen control unit 2103 includes a pixel clock buffer 2107, a horizontal synchronization clock buffer 2108, and a vertical synchronization clock buffer 2109. Furthermore, the screen control unit 2103 includes a port 2112 for receiving a display image, a port for receiving a pixel clock, a port for receiving a horizontal synchronization clock, and a port for receiving a vertical synchronization clock. The screen control unit 2103 receives the image information to be displayed from the port 2112, and the pixel location calculator 2106 determines the pixel value to be written in each coordinates of the image display unit 2101 from the image information, and the pixel value calculator 2105 calculates the color displayed on the coordinates. The result of calculation is transmitted to the image display device control unit 2104, and the image display device control unit records color information by driving each coordinates of the image display unit. In the case where the image display unit is made from a material unable to emit spontaneous light such as a liquid crystal, the backlight 2102 is provided at the back of the image display unit 2101 and the image display device control unit 2104 controls the luminosity of the backlight 2102. The clock for driving the image display unit is inputted from the clock converter 2110. Although a pixel clock, a horizontal synchronization clock, and a vertical synchronization clock are generally used, if required for driving the image display unit, the clock converter is configured to receive other clocks. When required clocks are a part of the above-mentioned clocks, there is no need to receive all the clocks, and a part of those may be provided as the pixel clock buffer 2107, the horizontal synchronization clock buffer 2108, and the vertical synchronization clock buffer 2109. The clock converter receives a clock which serves as a standard for displaying the input image from the clock generator 2111. In the example of the present configuration, the clock generator 2111 generates a clock independently of the inputted image, the clock generator may be configured that an input image generating device generates a suitable clock for displaying an image and outputs the clock to the clock converter 2110.

Figure 22:
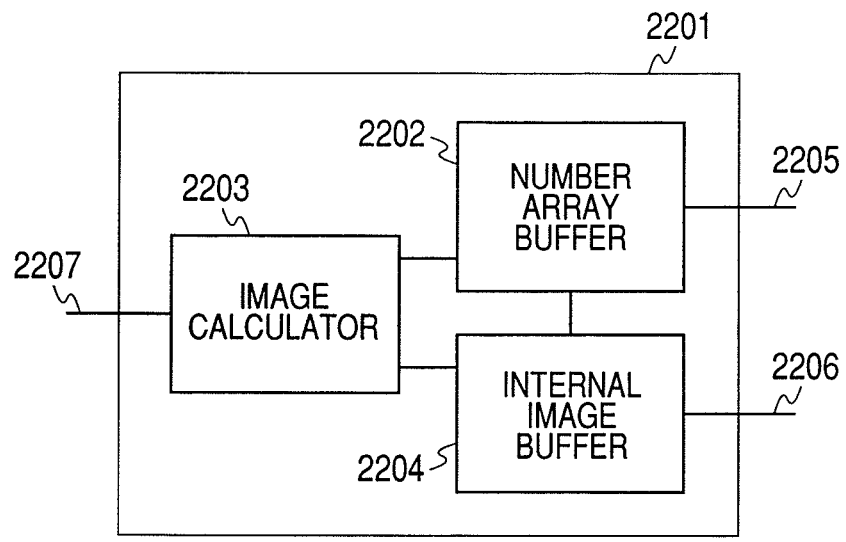
FIG. 22 shows a configuration of an image converter.

An example of configuration of an image converter 2201 is shown in FIG. 22. The image converter 2201 has a number array buffer 2202, an image calculator 2203, and an internal image buffer 2204. And the image converter 2201 includes a port 2205 for receiving a numerical sequence from the number array supplier, a port 2206 for inputting an image from the screen image generator or the image storage, and a port 2207 for outputting the generated converted image. The generated image output port 2207 is connected to the image storage. In the image converter 2201, the image calculator 2203 converts the image of the internal image buffer using the number array read from the number array buffer, and generates the converted image. The form of a number array and the example of the converting method of an input image are already described. There is no need to store at one time all the pixel values of the input image and all the number arrays used for conversion in the number array buffer or in the internal image buffer, and the number array buffer or the internal image buffer may suitably receive the required pixel values or the number arrays from the number array supplier, the image storage, or the screen image generator.

Figure 23:
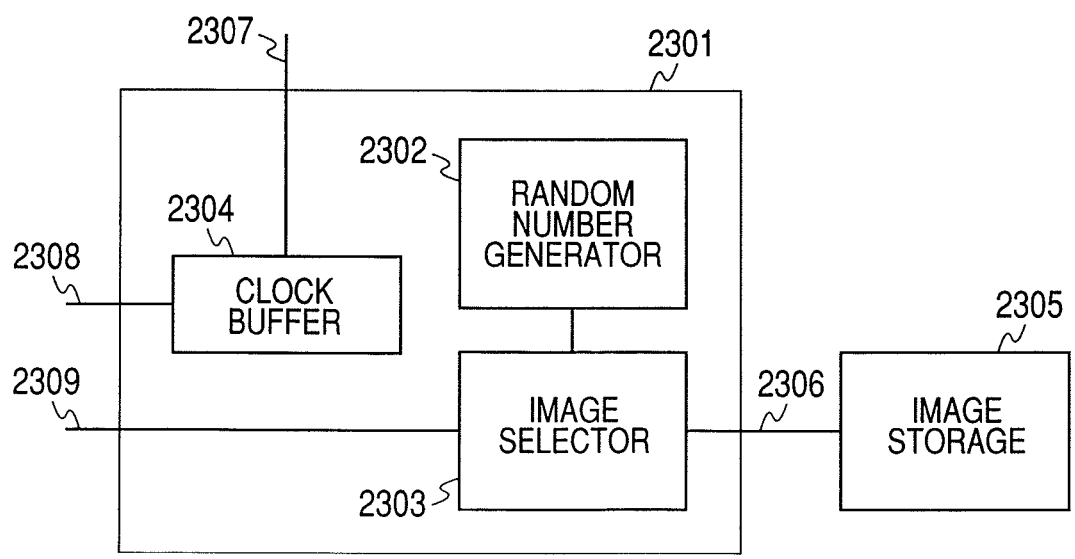
FIG. 23 shows a configuration of an image output unit.

FIG. 23 shows an example of configuration of an image output unit 2301. The image output unit 2301 of this example has an image selector 2303, a random number generator 2302, and a clock buffer 2304. And the image output unit 2301 includes a selected-image input port 2306 to the image storage 2305, an output port 2309 for a selected image, a clock input port 2307, and a clock output port 2308. The image selector 2303 calculates the address of the image to read based on the random number received from the random number generator 2302, reads an image from the image storage 2305, and outputs the image from the output port 2309. The image output unit receives the clock to determine the output rate of an image from the clock input port 2307, and stores the clock in the clock buffer 2304. When outputting an image, the image output unit outputs the image together with the clock held in the clock buffer from the clock output port 2308. The image output unit 2301 of the present example has a configuration wherein the random number generator 2302 is provided. In the above configuration the image selector reads an image from the image storage every time according to the output of the random number generator. Only when determining the converted image to read out from the image storage for the first time the random number generator is used, and after that images may be read out in the order the number indicated by the counter provided inside of the image output unit.

Alternatively, instead of a random number generator only a counter device is provided and the image output unit may be configured that the images recorded in the image storage may be read out one by one as is already described.

Thirteenth Embodiment

Figure 24:
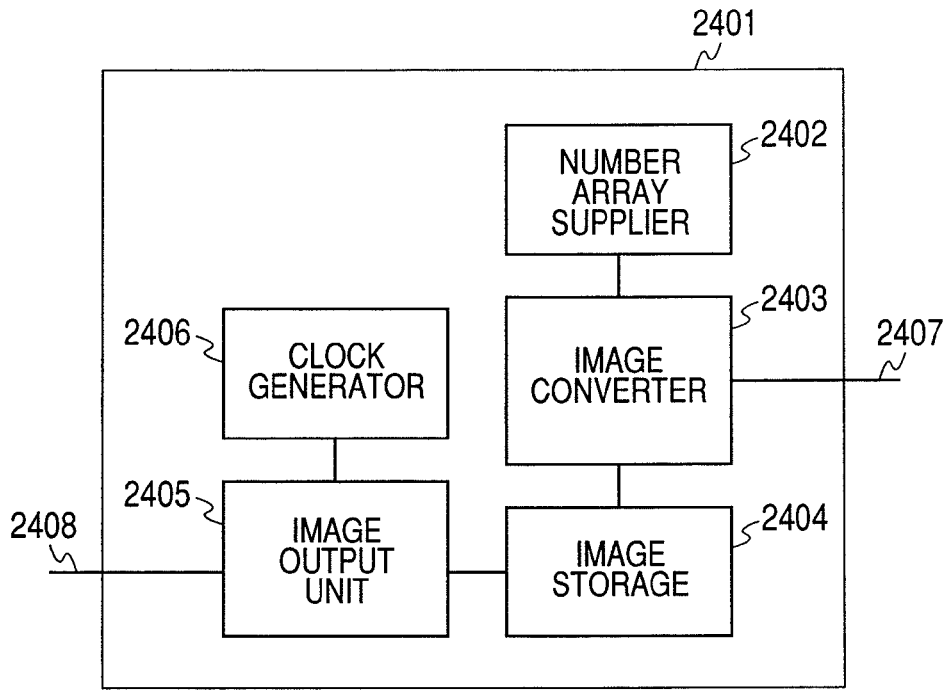
FIG. 24 shows a configuration of a display image converter provided with a clock generator.

FIG. 24 shows an example of one of the embodiments according to the present invention for a screen image converter for converting an inputted image and outputting a converted image. A screen image converter 2401 includes a number array supplier 2402, an image converter 2403, an image storage 2404, an image output unit 2405, and a clock generator 2406. And the screen image converter 2401 includes a port 2407 for inputting an image, and a port 2408 for outputting an image and a clock. In the screen image converter 2401, the image converter 2403 generates a plurality of converted images from the input image received from the port 2407 for inputting an image and from the output of the number array supplier 2402, and records the converted images on the image storage 2404. The image output unit 2405 chooses the image to output from the image storage, and outputs the image through the image and clock output port. The clock generator 2406 generates a horizontal synchronization clock and a vertical synchronization clock (this is equivalent also to the output rate of a screen) of the output image, and inputs both synchronization clocks to the image output unit 2405. The image output unit outputs an image with the inputted clock through the image and clock output port 2408. Although for the port 2407 for inputting an image and the image and clock output port 2408, common image input and output terminals are assumed, such as a VGA terminal, a DVI terminal, a composite terminal, an S terminal, a D connector, and a HDMI terminal, respectively, not such a standardized terminal but a terminal with an original form may be used. For example, since the present screen image converter is provided with a clock generator, the screen image converter may be configured that only an image is received from the image input port and clock information is not received.

Fourteenth Embodiment

Figure 25:
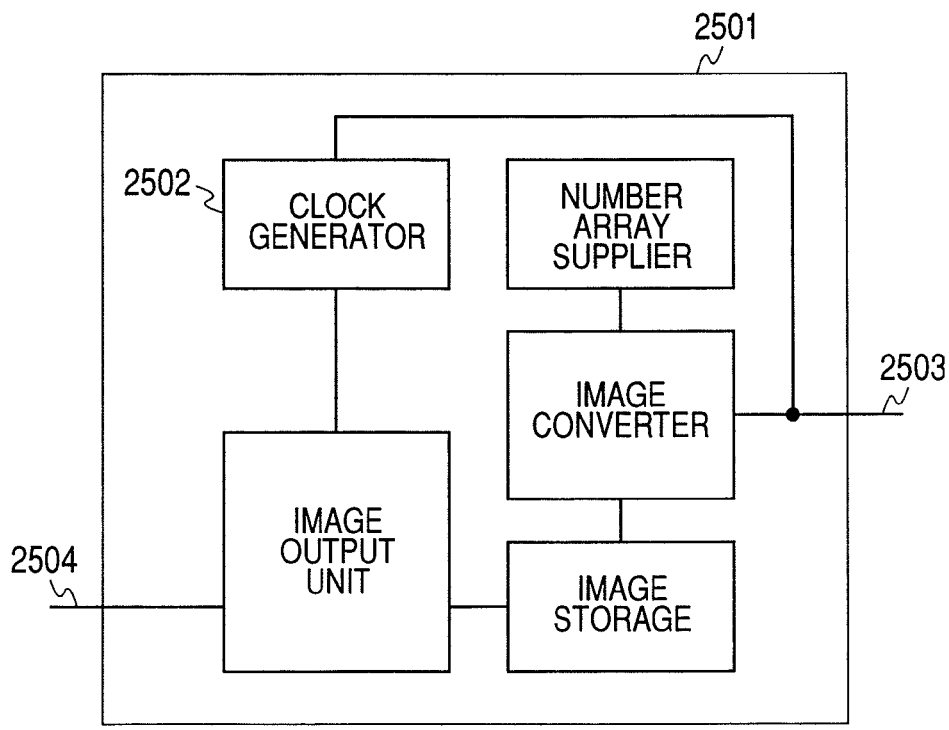
FIG. 25 shows a configuration of a display image converter provided with a clock converter.

FIG. 25 shows an example of configuration in the case where a screen image converter does not have a clock generator inside. The screen image converter 2501 has a clock converter 2502, and inputs into the clock converter the clock information received from an image input terminal 2503 with image information. A converted clock is outputted from an image and output clock port 2504 by the image output unit with a converted image stored in the image storage. The clock converter 2502 determines the speed of a conversion clock using the converted image converted from the input image, so that a displayed image equivalent to an inputted image may be recognized visually. For example, when carrying out the switching display of the multiple images for a short time and a display rate is 30 FPS (frame per second), the screen image converter is configured that the speed of display rate is increased from 30 FPS to 60 FPS. And in the case where the frame rate of the input image is 60 FPS and the image display unit is able to correspond to 120 FPS, the screen image converter is configured that the frame rate may be raised to 120 FPS and further directed to a higher speed. When the speed of input clock is high enough, there is no need for the clock of the output image to make faster.

Fifteenth Embodiment

Figure 26:
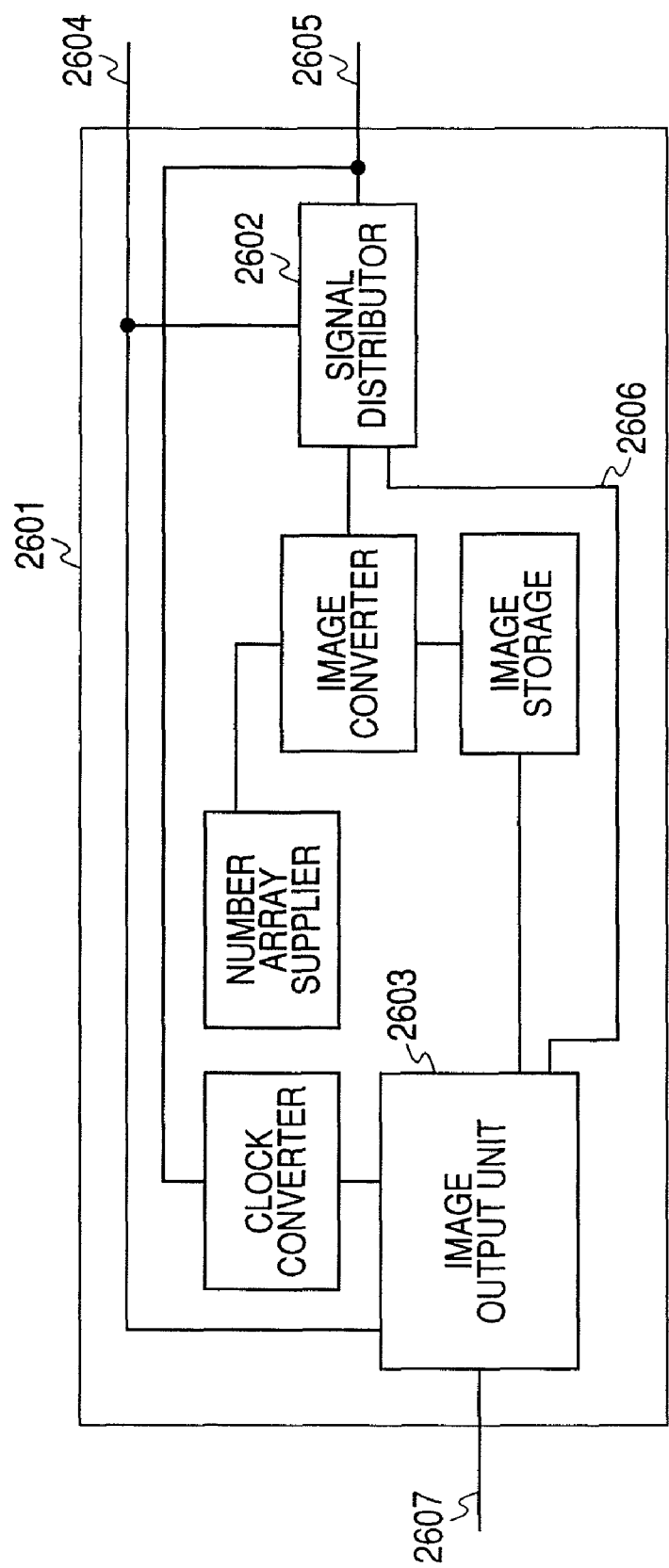
FIG. 26 shows a configuration of a display image converter provided with a signal distributor.

One of the examples of a screen image converter is shown in FIG. 26. The screen image converter 2601 of the present embodiment is further provided with a signal distributor 2602. And the screen image converter 2601 includes an input port 2604 for a control signal to control the operation of a signal distributor and an image output unit 2603. The signal distributor and the image output unit change the processing route of the input image by a control signal. As a processing route a signal line 2606 is further provided for passing the signal without processing other than image conversion processing using the output of the number array supplier. That is, the image information inputted from the image and clock input port 2605 is distributed to one of processing routes by the signal distributor, and chosen by the image output unit 2603 and outputted from the image and clock output port 2607 with the clock information.

For the configuration of this example, since the operation of the number array supplier and the image converter serve as a noise source, the effect of obstructing the interception of leakage electromagnetic waves is acquired when outputting data without any processing.

Sixteenth Embodiment

Figure 27:
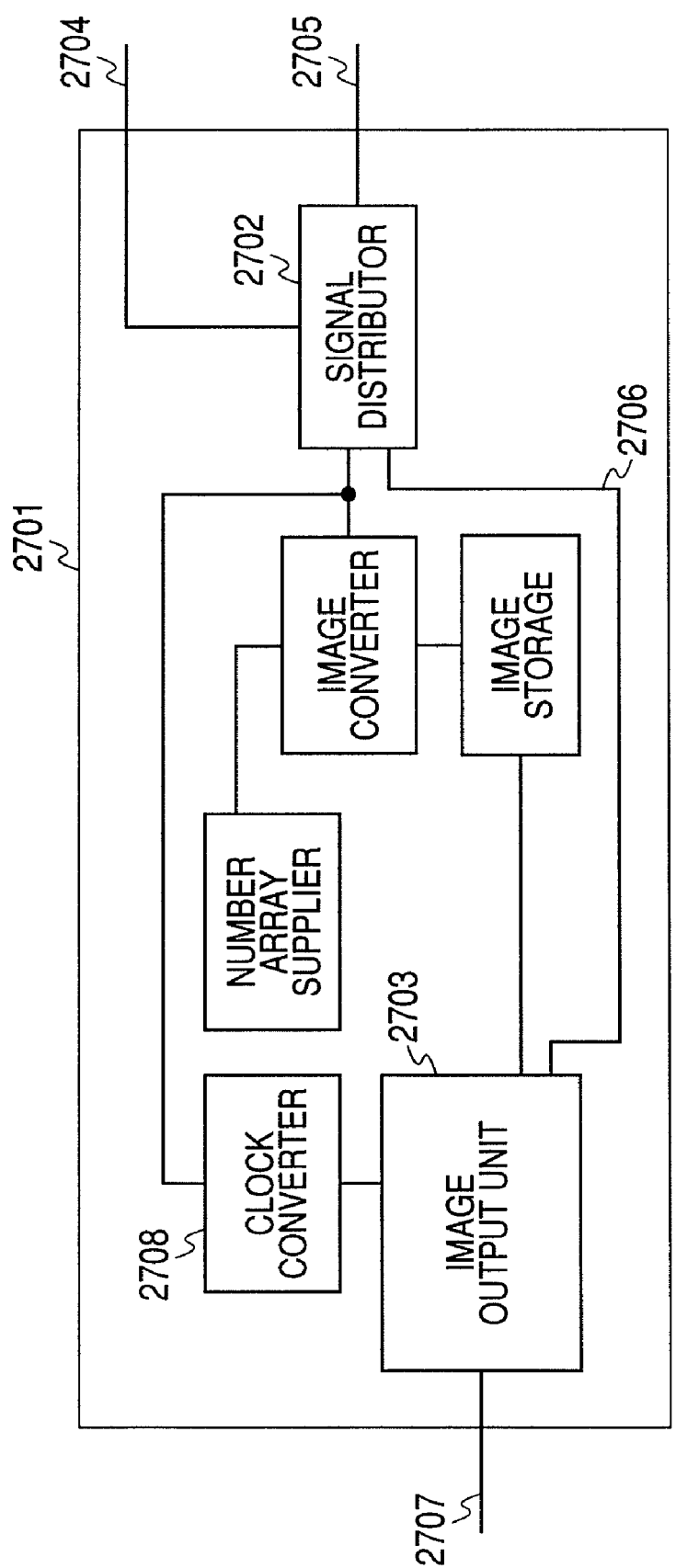
FIG. 27 shows a configuration of a display image converter which distributes clock information.

Although image information is inputted into the signal distributor and clock information is inputted into the clock converter in the example of the configuration in the 15th embodiment, FIG. 27 shows a screen image converter 2701 in which the image information and clock information inputted from an image and clock input port 2705 are distributed by a signal distributor 2702. Only the signal distributor is controlled from a control signal input port 2704 for controlling the signal distributor. In the screen image converter, since clock information is also included in a signal line 2706, the image output unit 2703 may operate with reference to the clock. Since when the signal distributor chooses to perform an image conversion a clock is supplied from a clock converter 2708, when no processing is chosen a clock is supplied from the signal line 2706, the image output unit 2703 can switch over the operation appropriately without referring to the signal from the control signal input port 2704, and output the image to be displayed with the clock from an image and clock output port 2707.

Seventeenth Embodiment

Figure 28:
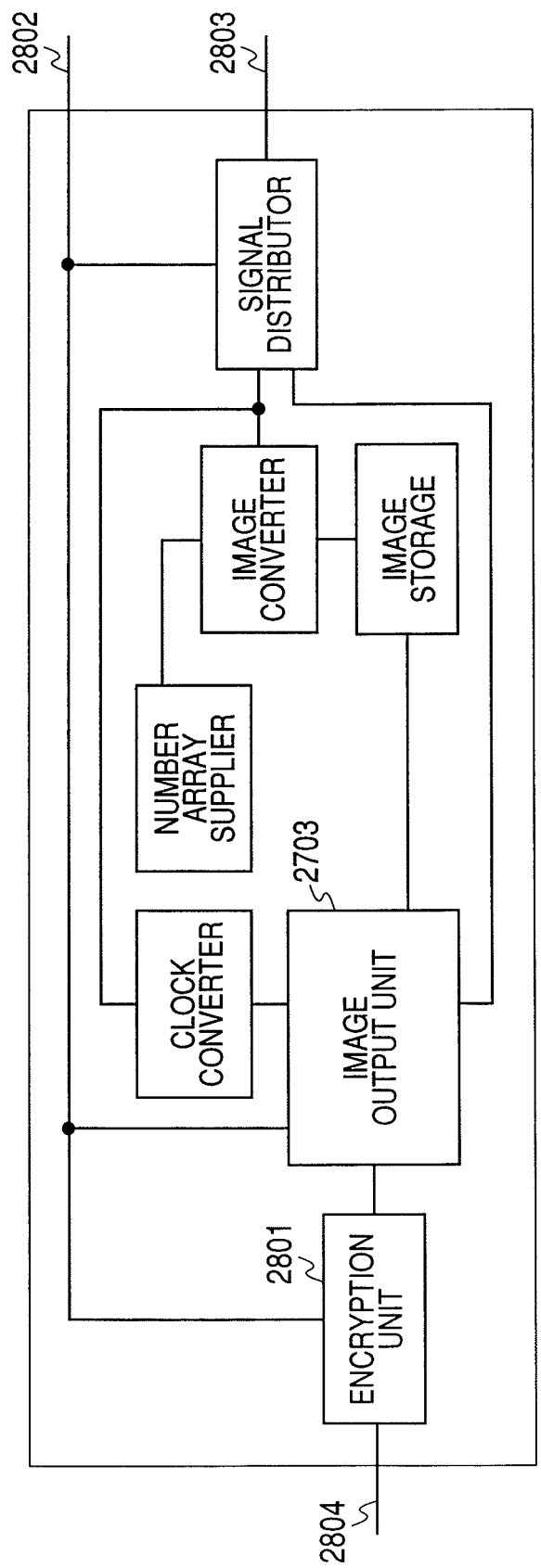
FIG. 28 shows a configuration of a display image converter which has an enciphering device.

In the example of FIG. 28, the screen image converter is further provided with an encryption unit 2801. If an encryption unit of a standardized system is used such as HDCP (High-bandwidth Digital Content Protection system) etc., wide-ranging devices are available as an image display unit for receiving information outputted from an image and clock output port 2804. Of course, an original cipher system may be used. The encryption unit 2801 can be controlled from the control signal input port 2802, and can also output an image, which is inputted from the image and clock input port 2803, from the port 2804 without enciphering. In this way, an image display unit which does not support an enciphering function can also be used.

Eighteenth Embodiment

Figure 29:
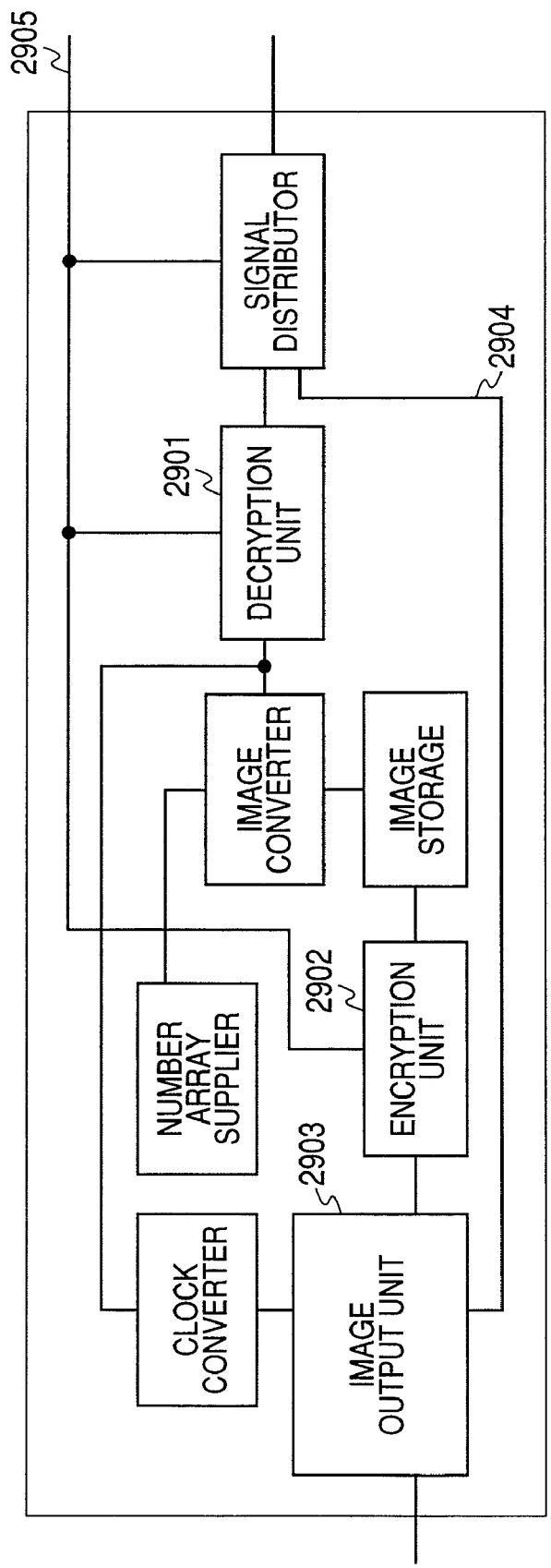
FIG. 29 shows a configuration of a display image converter which has a decoding device and an enciphering device.

The screen image converter of the example shown in FIG. 29 is provided with a decryption unit 2901 and an encryption unit 2902. The present screen image converter can be used also when the input image is enciphered. An encryption unit is not installed on a signal system route 2904. Therefore, when passing through the signal system route 2904 without processing, information is correctly transmitted irrespective of the existence of encryption. The decryption unit 2901 and the encryption unit 2902 are controllable from the outside, respectively, and can change processing according to the existence of encryption of the input image or the output image. The screen image converter can be configured to be easily connected to a common computer by choosing a control signal input port 2905 as, for example, a general-purpose terminal, such as USB.

Nineteenth Embodiment

Figure 30:
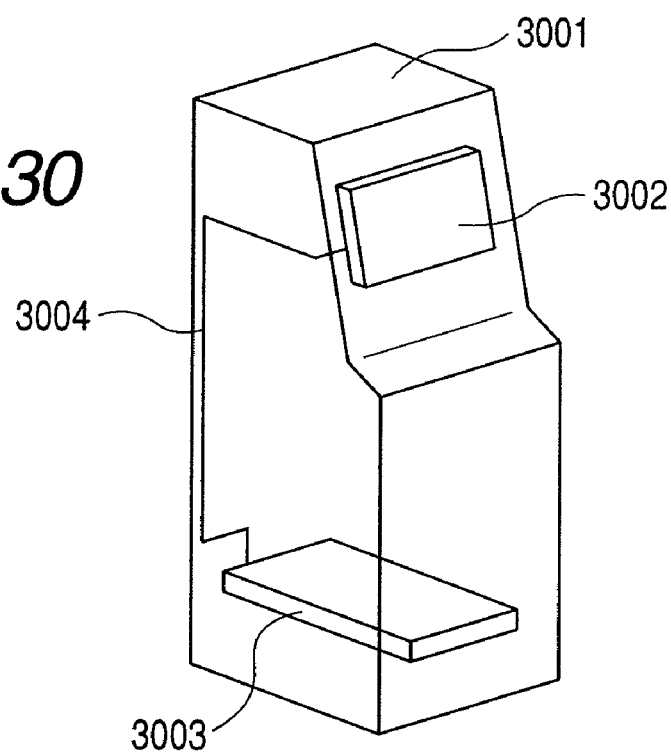
FIG. 30 is an ATM according to an embodiment of the present invention.

FIG. 30 shows an example of an ATM provided with an information display unit of the embodiment according to the present invention. An ATM 3001 of the present example has an image display unit 3002 and a screen image generation converter 3003, and the screen image generation converter and the image display unit are connected by a video cable 3004. The screen image generation converter has the screen image generator, the number array supplier, and the image converter, and generates a display image, and displays an image converted with the image converter using a numerical sequence obtained from the number array supplier on the image display unit through a video cable. As the information display device, two or more image display units may be provided as well as one image display unit.

Twentieth Embodiment

Figure 31:
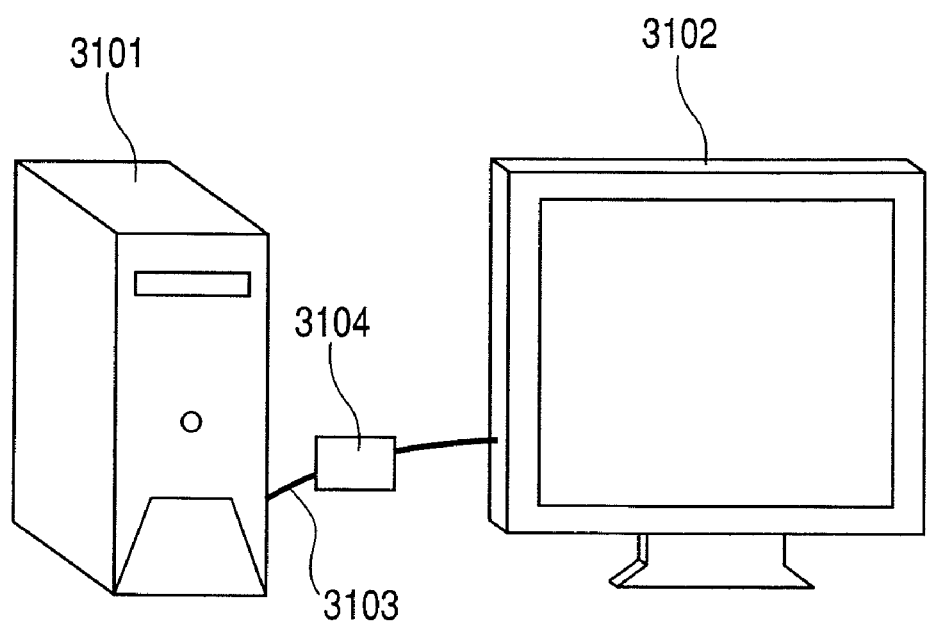
FIG. 31 is a computer according to an embodiment of the present invention.

FIG. 31 shows an example of a computer provided with the screen image converter of the embodiment according to the present invention. The computer includes a calculator 3101 and a display 3102, and the calculator and the display are connected by a video cable 3103. The calculator generates a document, an operation state, etc. as a image, and transmits the image to the display through the video cable. The computer of the present embodiment includes a screen image converter 3104 between the calculator and the display wherein a converted image is generated by calculating the input image with a numerical sequence supplied from the number array supplier when transmitting a display image, and the generated converted image is transmitted to a display. The screen image converter may be set up in the middle of the video cable as shown in FIG. 31, or inserted to the video signal output port of the computer, or may be self-contained in the computer. Since almost all the window terminals used when a person in charge responds to a customer have the same composition as the computer of this example, application of the embodiment of the present invention can also be performed in a similar way.

Twenty-First Embodiment

Figure 32:
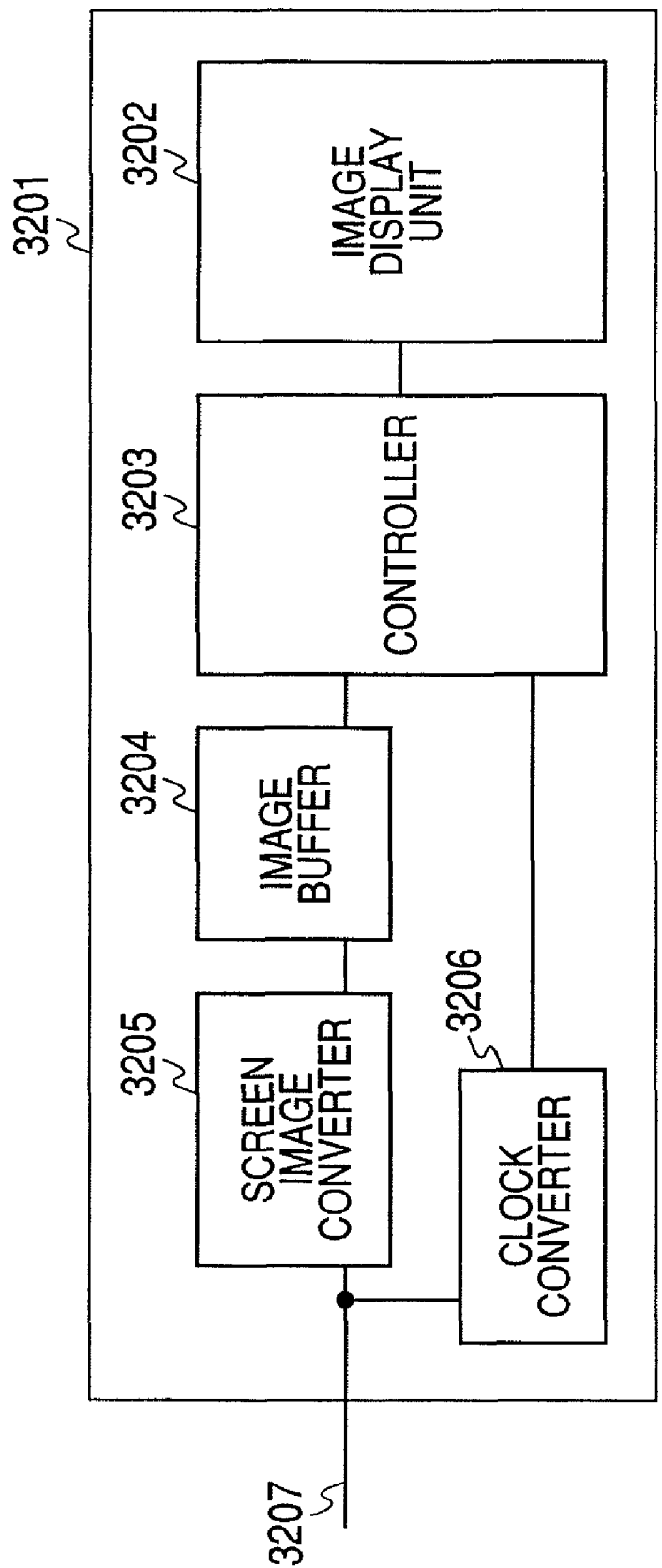
FIG. 32 is a display according to an embodiment of the present invention.

FIG. 32 shows an example of a display provided with the screen image converter of the embodiment according to the present invention. The present display 3201 has an image display unit 3202 such as a liquid crystal and a fluorescence tube, an image display unit controller, an image buffer 3204, a screen image converter 3205, and a clock converter 3206. And the display 3201 has an input port 3207 for image data and clock signals.

The display of the present embodiment separates image information and clock information inputted from the image and clock input port 3207, and the image information is inputted into the screen image converter, and the clock information is inputted into the clock converter. The screen image converter generates a converted image using the output of the number array supplier and the input image, and stores the converted image in the image buffer 3204. The controller 3203 reads the image recorded on the image buffer according to the conversion clock which is the output of the clock converter, and controls and displays the image display unit.

The technical items associated with the embodiments according to the present invention is as follows:

1. A screen image converter includes:
   a number array supplier for storing a number array and outputting the number array;
   an image converter for converting the screen image by calculating a digital screen image data with the number array from the number array supplier; and
   a memory storage for storing the converted image data generated by the image converter and outputting the converted image to the exterior.

The number array supplier has from the first to the Nth numerical sequences (N is an integer larger than 1) constituting a number array of n×m (n and m are integers equal to or larger than 1), the image converter receives the Mth inputted image (M∈{1, . . . , N}) of number array of n×m, and receives the Mth inputted number array from the number array supplier, records the Mth conversion result generated by calculating the Mth inputted image and the Mth inputted number array in the image storage, and outputs the converted result from the image storage successively.

2. In the screen image converter 1, the screen image converter has a random number generator, and the number array supplier supplies a value equal to or larger than 0 to less than k/2 to the maximum gradation k of the digital input image data using the random number generator from the first to the (N−1)th numerical sequences.

3. In the screen image converter described in 1, the number array supplier generates the Nth numerical sequence by calculating from the first to the (N−1)th numerical sequences.

4. In the screen image converter described in according 3, the image converter when denoting a value corresponding to the coordinates (i, j) of the input image by $a_{i,j}$ (i∈{, . . . , n}, j∈{1, . . . , m}), a numerical value corresponding to the coordinates (i, j) of the number array, by b i, j, and a value corresponding to the coordinates (I, j) of the conversion result by $a'_{i,j}$, calculates as $a'_{i,j}=a_{i,j}+b_{i,j}$ or $a'_{i,j}=a_{i,j}$.

5. In the screen image converter described in 4, the screen image converter has a random number generator, and the number array supplier generates from the first to the (N−1)th numerical sequences using the random number generator, denoting a value corresponding to the coordinates (I, j) of the k-th numerical sequence by $R_{k,i,j}$ (k∈{1, . . . , N}, i∈{1, . . . , n}, j∈{, . . . , m}), calculates and supplies the Nth numerical sequence as $R_{N,i,j}=-(R_{1,i,j}+ \ldots +R_{N-1,i,j})$.

6. In the screen image converter described in 3, the screen image converter has the random number generator, the image converter when denoting a value corresponding to the coordinates (i, j) of the input image by ai, j (i∈{1, . . . , n}, j∈{1, . . . , m}), a numerical value corresponding to the coordinates (i, j) of the number array by bi, j, and a value corresponding to the coordinates (I, j) of the conversion result by $a'_{i,j}$, calculates as $a'_{i,j}=a_{i,j} \times b_{i,j}$, the number array supplier generates from the first to the (N−1)th numerical sequences using the random number generator, and calculate and supplies the Nth numerical sequence as $R_{N,j}=N(R_{1,j}+ \ldots +R_{N-1,j})$ 7. In the screen image converter described in 5, the screen image converter outputs a numerical sequence group from the image storage with a speed of 30 frames or more per second as a result of conversion.

8. In the screen image converter described in 7, the screen image converter has an image system converter and the image system converter generates a color system converted image of the input image from the first to the second color systems, the image converter receives the color system converted image and obtains the Mth converted image generated by calculation of the Mth input image and the Mth numerical sequence, the screen image converter records in the image storage the result of conversion of the converted image from the second to the first color systems.

9. In the screen image converter described in 8, the first color system is an RGB color system and the second color system is a CMY color system.

10. An automatic teller machine, a window terminal, or a display device equipped with the screen image converter described in 9.

11. A screen information converter includes:
   a display image input port for inputting a display image outputted for a display unit;
   a clock input terminal for inputting a clock for a display of a display image outputted to a display device;
   a number array supplier for maintaining a numerical sequence and outputting the numerical sequence;
   an image converter for converting the digital display image by calculating the digital display image data received from the screen image input terminal and the numerical sequence data from the number array supplier;
   an image storage for storing the image data converted and generated by the image converter and outputting the converted image data to the exterior;
   a clock converter for converting the frequency of an image display clock received from the clock input terminal and outputting the converted clock;
   a display image output terminal for outputting the image data outputted from the image storage to the exterior; and
   an output clock terminal for outputting the converted clock.

The number array supplier has from the first to the Nth numerical sequences (N is an integer larger than 1) constituting a number array of n×m, and the image converter receives the Mth input image (M∈{1, ..., N}) which is a number array of n×m (n and m are integers equal to or larger than 1), and receives the Mth numerical sequence from the number array supplier, calculates the Mth input image and the Mth numerical sequence and stores the conversion result of the generated Mth image in the image storage, the clock converter generates a conversion clock, from the input clock, with a frequency of M times higher (M is a rational number equal to or larger than 1) than that of the input clock received from the clock input terminal, and outputs the converted images from the image storage and the conversion clock from the clock output terminal one by one.

12. In the screen information converter described in 11, assuming a gradation number of the pixels of the input image to k, and as the first to the (N−1)th numerical sequences, the number array supplier generates arbitrarily an integer sequence with the integer larger than −k and less than k, and denoting a numerical value corresponding to the coordinates (i, j) of the k-th numerical sequence by $R_{k,i,j}$ (k∈{1, ..., N}, i∈{1, ..., n}, j∈{1, ..., m}), calculates and generates with $R_{N,i,j}$ as $R_{N,i,j} = -(R_{1,i,j} + ... + R_{N-1,i,j})$, and the image converter when denoting a value corresponding to the coordinates (i, j) of the input image by $a_{i,j}$ (i∈{1, ..., n}, j∈{1, ..., m}), a numerical value corresponding to the coordinates (i, j) of the number array, by $b_{i,j}$, and a value corresponding to the coordinates (i, j) of the conversion result by $a'_{i,j}$, calculates as $a'_{i,j} = a_{i,j} + b_{i,j}$.

13. In the screen information converter described in 12, the image generator when the result of addition of a pixel value of the input image and the numerical sequence is larger than the maximum gradation value k, sets the result of addition to k, and when the result of addition is less than 0 sets the result of addition to 0.

14. In the screen information converter described in 13, in the case where the value $a'_{i,j}$ of the coordinates (i, j) of the Mth converted image is larger than the maximum gradation value k, p is calculated as $p = a'_{i,j}$ and the value of p thus obtained is added to the (M+1)th converted images, and in the case where the value $a'_{i,j}$ is less than 0, p is calculated as $p = a'_{i,j}$ and the value of p thus obtained is subtracted from the (M+1)th converted images.

15. In the screen information converter described in 14, the clock converter assuming the frequency of an input clock is F [Hz], and A is an arbitrary integer equal to or larger than 30 and equal to or less than 1000, calculates the magnification M of the conversion clock as M=A/F.

16. In the screen information converter described in 15, the number array supplier is provided with a random number generator and the number array supplier generates from the first to the (N−1)th numerical sequences using the random number generator.

17. In the screen information converter described in 15, the image generator generates the first converted image using the first numerical sequence and the first input image, and generates from the second to the N-th converted images using from the second to the Nth numerical sequences and the first input image, respectively.

18. In the screen information converter described in 6, the screen information converter has an image system converter and the image system converter converts the input image of the first color system to the second color system, the image converter generates the converted image using the converted image of the second color system, and the screen image converter converts the converted image from the second to the first color systems.

19. In the screen information converter described in 18, the number N of number arrays is 2.

20. In the screen information converter described in 19, the image system converter has a signal line for setting up operation or non-operation, and the image converter generates the setting up signal for operation or non-operation every conversion of one pixel of the input image, and controls the operation or non-operation of the image system converter.

21. The screen information converter described in 20 is characterized in that the first color system is RGB color space and the second color system is CMY color space.

22. In an automatic teller machine, a window terminal, or a display device, a screen information converter described in 17 is mounted.

23. In an automatic teller machine, a window terminal, or a display device, a screen information converter described in 20 is mounted.

24. An information display method is composed of the steps of:
   receiving the digital display image of a number array of n×m and recording the digital display image in a memory storage,
   generating N groups (N is an integer equal to or larger than two) of arbitrary number arrays of n×m by operating an arithmetic unit,
   generating a converted image by operating the arithmetic unit to add the value of the coordinates (i, j) (i∈{1, ..., n}, j∈{1, ..., m}) of the digital display image and the numerical value of the coordinates (i, j) of the number array,
   recording the converted image on the memory storage, and
   operating the image output unit for outputting the converted image stored in the memory storage. The information display method is characterized in that recording the input image in the memory storage one by one for N times by repeating from the first to the Nth input image, and generating a converted image successively from the first to the Nth converted images by repeating the step to generate the converted image for N times and storing the converted image in the memory storage, and the step of operating the image output unit outputs the image recorded on the memory storage one by one.

25. The screen image converter described in 24 is characterized in that the step for generating the number array is generated by calculating from the first to the (N−1)th number arrays.

26. The information display method described in 25 is characterized in that the information display method has a random number generator, and denoting gradation of the digital display image by k and in the number array generating step from the first to the (N−1)th number arrays are generated with integers larger than −k and less than k using the random number generator, and the Nth number array is generated by subtracting the result of addition from the first to the (N−1)th number arrays from 0.

27. The information display method described in 26 is characterized in that in the step of generating the converted image when the result of addition of the digital input image pixel value and the number array is larger than the maximum gradation of the image k the result is set to k, when the result of addition is less than 0 the result is set to 0.

28. The information display method described in 27 is characterized in that in the step of generating the converted image when the value $a'_{i,j}$ of the coordinates (i, j) of the Mth converted image is larger than the maximum gradation value k, p is calculated from $p=a'_{i,j,k}$ and added to the (M+1)th converted image, and when the value $a'_{i,j}$ is less than 0, p is calculated from $p=a'_{i,j}$ and subtracted from the (M+1)th converted image.

29. The information display method described in 28 is characterized in that the step of operating the image output unit outputs the images stored in the memory storage one by one with a frame rate not less than 30-Hz frame rate.

30. An automatic teller machine, a window terminal, or a display device utilizes the information display method described in 29.

31. The information display method includes the steps of:
receiving a digital display image data of n×m number array and storing the data in a memory storage,
operating an arithmetic unit and generating N arbitrary number arrays (N is an integer equal to or larger than 1) of n×m,
generating N+1 converted images of number arrays of sn×tm (at least one of the two of s and t is a natural number larger than 1), and
recording the converted images in the memory storage, in which the converted image generating step generates using the first template with s×t/2 pixels set to 0 and the remaining s×t/2 pixels set to 1 among s×t pixels and the second template with the pixel values of the first template reversed, by copying the first template to a rectangle with the coordinates (si, tj) of the Mth converted image as the upper left and the coordinates (s(i+1)−1, t(j+1)−1) as the lower right if the value of the coordinates (i, j) of the Mth number array (M∈{1, ..., N}) is 0, and by copying the second template to a rectangle with the coordinates (si, tj) of the Mth converted image as the upper left and the coordinates (s(i+1)−1, t(j+1)−1) as the lower right if the value of the coordinates (i, j) of the Mth number array is 1, and the step of recording the converted images in the memory storage is to generate the converted image by the same method as the converted image generating step using the (N+1)th number array generated by performing EXCLUSIVE OR operation for digital display image data with the first to the Nth number arrays.

32. The information display method described in 31 is characterized in that the number N of the number array is 1 and an outputting step of the converted image is to output the two converted images alternately.

33. The information display method described in 32 is characterized in that in the converted image outputting step the converted image recorded in the memory storage is outputted successively with a frame rate of not less than 30 Hz.

34. The information display method described in 33 is characterized in that the information display method has a step for receiving a pixel size A [mm$^2$] of a display and setting the s and t to larger than or equal to $1/(100*\sqrt{A})$ and less than $1/\sqrt{A}$, respectively.

35. An automatic teller machine, a window terminal, or a display device employs the information display method described in 34.

36. An image conversion display unit includes:
a number array supplier for maintaining a number array and outputting the number array,
an image converter for converting the digital display image by calculating the digital display image data and the number array data from the number array supplier,
a storage for storing the converted image data generated by the image converter and outputting to a display, and
number of N displays (N is an integer larger than 1) for displaying the image data, in which
the number array supplier has number arrays from the first to the Nth of n×m, the image converter receives the Mth input image (M∈{1, ..., N}) of n×m number array (n and m are integers larger than or equal to 1) and the Mth number array from the number array supplier, records the Mth conversion result generated by calculating the Mth input image and the Mth number array in the image storage, and outputs the Mth conversion result to the Mth display from the image storage.

37. The image conversion display unit described in 36 is characterized in that the image conversion display unit has a liquid crystal layer.

38. An automatic teller machine, a window terminal, or a display device is equipped with the image conversion display unit described in 37.

What is claimed is:

1. A screen image converter comprising:
a number array supplier for storing a number array and outputting the number array;
an image converter for converting the screen image by calculating converted digital screen image data with the number array from the number array supplier; and
a memory storage for storing the converted image data calculated by the image converter and outputting the converted image to an exterior;
wherein the number array supplier has from first to Nth numerical sequences (N is an integer larger than 1) constituting a number array of n×m (n and m are integers equal to or larger than 1), the image converter receives an Mth inputted image (M∈{1, ..., N}) of number array of n×m, and receives an Mth inputted number array from the number array supplier, records an Mth conversion result generated by calculating the Mth inputted image and the Mth inputted number array in the image storage, and outputs the converted result from the memory storage successively.

2. The screen image converter according to claim 1, wherein the screen image converter has a random number generator, and the number array supplier supplies a value equal to or larger than −k to less than k to a maximum gradation k of digital input image data using the random number generator from the first to the (N−1)th numerical sequences.

3. The screen image converter according to claim 1, wherein the number array supplier generates the Nth numerical sequence by calculating from the first to the (N−1)th numerical sequences.

4. The screen image converter according to claim 3, wherein the image converter when denoting a value corresponding to coordinates (i, j) of an input image by $a_{i,j}$ (i∈{1, ..., n}, j∈{1, ..., m}), a numerical value corresponding to coordinates (i, j) of the number array, by $b_{i,j}$, and a value corresponding to coordinates (i, j) of the conversion result by $a'_{i,j}$, calculates as $a'_{i,j}=a_{i,j}+b_{i,j}$.

5. The screen image converter according to claim 4, wherein the screen image converter has a random number generator, and the number array supplier generates from the first to the (N−1)th numerical sequences using the random number generator, denoting a value corresponding to coordinates (i,j) of k-th numerical sequence by $R_{k,i,j}$ (k∈{1, ..., N}, i∈{1, ..., n}, j∈{1, ..., m}), calculates and supplies the Nth numerical sequence as $R_{N,i,j}=-(R_{1,i,j}+ ... +R_{N-1,i,j})$.

6. The screen image converter according to claim 5, wherein the screen image converter outputs a numerical sequence group from the memory storage with a speed of 30 frames or more per second as a result of conversion.

7. The screen image converter according to claim 6, wherein the screen image converter has an image contrast compressor, the image contrast compressor calculating a pixel value of new input image $P'_{i,j}=\alpha \times p_{i,j}+\beta$, where pi,j is coordinates (i,j) of an input image and α is a real number or a rational number larger than 0 and less than 1, and β is an integer in a range between 1 to 255.

8. The screen image converter according to claim 7, wherein the screen image converter has an image system converter and the image system converter generates a color system converted image of an input image from first to second color systems, the image system converter receiving a color system converted image and obtains an Mth converted image generated by calculation of an Mth input image and an Mth numerical sequence, the screen image converter recording in the memory storage the result of conversion of the converted image from the second to the first color systems.

9. The screen image converter according to claim 8, wherein the first color system is an RGB color system and the second color system is a CMY color system.

10. A screen information converter comprising:
a display image input port for inputting a display image outputted for a display unit;
a clock input terminal for inputting a clock for a display of a display image outputted to a display device;
a number array supplier for maintaining a numerical sequence and outputting the numerical sequence;
an image converter for converting a digital display image by calculating digital display image data received from the display image input terminal and numerical sequence data from the number array supplier;
an image storage for storing the image data converted and calculated by the image converter and outputting the converted image data to an exterior;
a clock converter for converting a frequency of an image display clock received from the clock input terminal and outputting the converted clock;
a display image output terminal for outputting the image data outputted from the image storage to the exterior; and
an output clock terminal for outputting the converted clock;
wherein the number array supplier has from first to Nth numerical sequences (N is an integer larger than 1) constituting a number array of n×m, and the image converter receives Mth input image (M∈{1, ..., N}) which is a number array of n×m (n and m are integers equal to or larger than 1), and receives an Mth numerical sequence from the number array supplier, calculates the Mth input image and the Mth numerical sequence and stores the conversion result of the generated Mth image in the image storage, the clock converter generates a conversion clock, from the input clock, with a frequency of L times higher (L is a rational number equal to or larger than 1) than that of the input clock received from the clock input terminal, and outputs converted images from the image storage and the conversion clock from the clock output terminal one by one.

11. The screen information converter according to claim 10, wherein assuming a gradation number of the pixels of the input image to k, and as the first to the (N−1)th numerical sequences, the number array supplier generates arbitrarily an integer sequence with the integer larger than −k and less than k, and denoting a numerical value corresponding to coordinates (i, j) of a k-th numerical sequence by $R_{k,i,j}$ (k∈{1, ..., N}, i∈{1, ..., n}, j∈{1, ..., m}), calculates and generates with $R_{N,i,j}$ as $R_{N,i,j}=-(R_{1,i,j}+ ... +R_{N-1,i,j})$, and the image converter when denoting a value corresponding to coordinates (i, j) of the input image by $a_{i,j}$ (i∈{1, ..., n}, j{1, ..., m}), a numerical value corresponding to coordinates (i, j) of the number array, by $b_{i,j}$, and a value corresponding to coordinates (i, j) of the conversion result by $a'_{i,j}$, calculates as $a'_{i,j}=a_{i,j}+b_{i,j}$.

12. The screen information converter according to claim 11, wherein the image generator when a result of addition of a pixel value of the input image and the numerical sequence is larger than a maximum gradation value k, sets the result of addition to k, and when the result of addition is less than 0 sets the result of addition to 0.

13. The screen information converter according to claim 12, wherein in the case where the value $a'_{i,j}$ of the coordinates (i, j) of an Mth converted image is larger than the maximum gradation value k, p is calculated as $p=a'_{i,j}-k$ and a value of p thus obtained is added to an (M+1)th converted images, and in the case where the value $a'_{i,j}$ is less than 0, p is calculated as $p=a'_{i,j}$ and a value of p thus obtained is subtracted from the (M+1)th converted images.

14. The screen information converter according to claim 13, wherein the clock converter assuming the frequency of an image input rate is F [Hz], and A is an arbitrary integer equal to or larger than 30 and equal to or less than 1000, calculates a magnification L of the conversion clock as L=A/F.

15. The screen information converter according to claim 14, wherein the number array supplier is provided with a random number generator and the number array supplier generates from the first to the (N−1)th numerical sequences using the random number generator.

16. The screen information converter according to claim 14, wherein the image generator generates a first converted image using the first numerical sequence and a first input image, and generates from second to the N-th converted images using from a second to the Nth numerical sequences and the first input image, respectively.

17. The screen information converter according to claim 15, wherein the number N of number arrays is 2.

18. The screen information converter according to claim 17, wherein the screen information converter has an image system converter and the image system converter converts an input image of a first color system to a second color system, the image converter generates the converted image using the converted image of the second color system, and the screen image converter converts the converted image from the second to the first color systems.

19. The screen information converter according to claim 18, wherein the image system converter has a signal line for setting up operation or non-operation, and the image converter generates the setting up signal for operation or non-operation energy conversion of one pixel of the input image, and controls the operation or non-operation of the image system converter.

* * * * *